(12) United States Patent
Kempeneers et al.

(10) Patent No.: US 12,019,299 B2
(45) Date of Patent: Jun. 25, 2024

(54) FIBER OPTIC TRAY

(71) Applicant: COMMSCOPE CONNECTIVITY BELGIUM BVBA, Kessel-Lo (BE)

(72) Inventors: Dirk Kempeneers, Aarschot (BE); Roger Alaerts, Aarschot (BE); Stephane Collart, Turnhout (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 92 days.

(21) Appl. No.: 17/530,240

(22) Filed: Nov. 18, 2021

(65) Prior Publication Data

US 2022/0137313 A1 May 5, 2022

Related U.S. Application Data

(63) Continuation of application No. 16/629,195, filed as application No. PCT/EP2018/068149 on Jul. 4, 2018, now Pat. No. 11,187,865.

(60) Provisional application No. 62/529,737, filed on Jul. 7, 2017.

(51) Int. Cl.
*G02B 6/44* (2006.01)
(52) U.S. Cl.
CPC ......... *G02B 6/4454* (2013.01); *G02B 6/4457* (2013.01)
(58) Field of Classification Search
CPC ....... G02B 6/44; G02B 6/4454; G02B 6/4457
See application file for complete search history.

(56) References Cited

U.S. PATENT DOCUMENTS

| | | |
|---|---|---|
| 5,206,927 A | 4/1993 | Finzel et al. |
| 6,215,938 B1 | 4/2001 | Reitmeier et al. |
| 6,330,389 B1 | 12/2001 | Daoud et al. |
| 6,532,327 B1 | 3/2003 | Gatica et al. |
| 7,072,560 B1 | 7/2006 | Bramson |
| 7,533,841 B1 | 5/2009 | Harrison et al. |
| 2002/0172489 A1 | 11/2002 | Daoud et al. |
| 2008/0205844 A1 | 8/2008 | Castonguay et al. |
| 2009/0290842 A1 | 11/2009 | Bran de Leon et al. |
| 2010/0061693 A1 | 3/2010 | Bran de Leon et al. |
| 2011/0222829 A1 | 9/2011 | Loeffelholz et al. |
| 2011/0299823 A1 | 12/2011 | Bran de Leon et al. |
| 2013/0243386 A1 | 9/2013 | Pimentel et al. |
| 2014/0219622 A1 | 8/2014 | Coan et al. |
| 2016/0116697 A1 | 4/2016 | Kostecka et al. |
| 2016/0370552 A1 | 12/2016 | Lambourn et al. |
| 2020/0371290 A1 | 11/2020 | Abbiati |
| 2021/0088743 A1 | 3/2021 | Kempeneers et al. |

OTHER PUBLICATIONS

International Search Report and Written Opinion of the International Searching Authority for International Patent Application No. PCT/EP2018/068149 dated Sep. 17, 2018, 14 pages.
FOSC-400D5 Installation Instructions, Fiber Optic Splice Closure with integrated organizer systerm, CommScope, 20 pages (Feb. 2017).

*Primary Examiner* — Tina M Wong
(74) *Attorney, Agent, or Firm* — Merchant & Gould P.C.

(57) ABSTRACT

Fiber optic trays adapted to increase fiber splicing/connecting and fiber organizing capacity on the tray. The trays can include multiple splice circuits, each splice circuit including a splice holder area or a connector holder area having a plurality of splice holders or connector holders, and a at least one fiber organizing structure such as a spool structure.

17 Claims, 15 Drawing Sheets

FIBER OPTIC TRAY

CROSS-REFERENCE TO RELATED APPLICATION

This application is a continuation of U.S. patent application Ser. No. 16/629,195, filed on Jan. 7, 2020, now U.S. Pat. No. 11,187,865, which is a National Stage Application of PCT/EP2018/068149, filed on Jul. 4, 2018, which claims the benefit of U.S. Patent Application Ser. No. 62/529,737, filed on Jul. 7, 2017, the disclosures of which are incorporated herein by reference in their entireties. To the extent appropriate, a claim of priority is made to each of the above disclosed applications.

BACKGROUND

Fiber optic cables carry optical fibers that transmit optical signals to and from telecommunications equipment. Typically, large cables, such as trunk cables, carry a large number of fibers. The fibers of the trunk cable are spliced and then routed to a desired destination, e.g., a building. Due to the large number of fibers being spliced and the need to protect the splices, the trunk cable is often terminated in a fiber optic splice closure. Such fiber optic splice closures typically include an outer ruggedized and sealable shell defining an interior volume and one or more ports for cable access to the interior. The closures can be adapted for outdoor or indoor use.

The interior volume of a splice closure typically houses structures and equipment to splice and organize fibers to facilitate both storing of fibers and routing of fibers to their desired destinations. Splice trays housed in splice closures receive fibers from input and output cables. Splice closures can house and mount a plurality of splice trays, typically arranged in a stack, that are individually accessible by pivoting other trays in the stack away from the tray that is to be worked with, the trays being pivotally coupled to a mounting structure housed within the closure.

Typically, a splice tray includes a splice area and a fiber organizing area for fibers from each of an input cable and an output cable. The terms input cable and output cable will be used herein for convenience to refer to any pair of cables entering the splice enclosure having one or more fibers that can be spliced to each other within the closure. Thus, in general terms, the splicing of fibers from an input cable to fibers of an output cable is simply splicing fibers from a first cable attached at a distal end to first telecommunications equipment to fibers of a second cable attached at a distal end to second telecommunications equipment, wherein the proximal ends of both cables enter the splice closure.

The splice area of the splice tray typically includes splice holders, each adapted to hold and protect a splice. Each organizing area in a splice tray typically includes a spooling or looping structure where excess fiber slack, including any slack needed to perform the splice operation can be stored.

In certain applications, efficient use of the interior volume of the splice closure is desirable, i.e., it is desirable to maximize the number of splices per unit volume that a splice closure can accommodate.

SUMMARY

In general terms, the present disclosure is directed to a fiber optic tray having improved space efficiency on the tray for organizing and routing of fibers.

The trays of the present disclosure can be used to hold fiber optic splices and/or to hold fiber optic connectors that terminate fibers. In either case, optical signals pass from a fiber or set of fibers to another fiber or set of fibers via the optical link established by either the splice or the connector junction. A connector to connector junction can be facilitated by a fiber optic adapter that receives the connectors, and/or with another connector coupling mechanism.

According to certain aspects of the present disclosure, a fiber optic splice tray has a major surface supporting a plurality of splice holders and at least one fiber organizing structure. The fiber organizing structure can be configured to store optical fiber slack in one or more loops or portions of loops. The fiber organizing structures are configured to accommodate minimum bend radius specifications of the stored fibers, e.g., to prevent the formation of fiber loops that can damage the fibers from over-bending or result in signal loss. The tray can include one or more additional bend radius limiters beyond the fiber organizing structure themselves to prevent over bending of the fibers as they are routed on the tray. In some examples, the tray itself is approximately oblong in shape and is defined by a major axis and a minor axis.

In general terms, each fiber organizing structure in accordance with the present disclosure includes a wall protruding substantially perpendicularly from the main surface of the tray. The wall forms an enclosed or substantially enclosed shape, with an outer surface of the wall facing away from the center of the enclosed shape. The outer surface of the wall defines the bending limit of fibers looped around the wall. The wall can define or approximately define a fiber organizing structure such as a spool structure having a substantially oblong shape defined by major and minor axes, wherein the major axis substantially defines a fiber loop diameter that defines approximately a minimum bend radius of the fiber loop.

The substantially oblong shape of the fiber organizing structures can allow for the tray to support more fiber organizing structures per unit area of the major surface than spool structures that are round in shape or substantially round in shape. To improve space efficiency on the splice tray, pairs of the oblong fiber organizing structures in the form of spool structures can be placed relatively near each other on the splice tray such that fiber loops stored on each spool structure must overlap fiber loops stored on the other spool structure to ensure minimum bend radii of the fiber loops are preserved. In some examples, one or more of the spool structures can include a recess adapted to route fibers looped around another of the spool structures. Thus, the spool structures can be adapted to coordinate with one another on a single tray to maximize space efficiency on the tray.

In some examples, the recesses in the spool structures are curved, the curvature being defined by a radius of curvature that is greater than or equal to the radius of curvature of the fiber loop or loops received in the recess.

A pair of spool structures can be associated with a splice circuit, in which a first set of fibers from an input cable are spliced to a first set of fibers from an output cable, the splices being held in a group of splice holders supported on the tray.

A single tray can support multiple circuits. For example, in a two circuit tray a first pair of spool structures can be associated with the first splice circuit, in which a first set of fibers from an input cable are spliced to a first set of fibers from an output cable, the splices being held in a first group of splice holders supported on the tray; and a second pair of spool structures can be associated with the second splice circuit, in which a second set of fibers from the same or a different input cable are spliced to a second set of fibers from the same or a different output cable, the splices being held in a second group of splice holders supported on the tray.

In some examples, in order to fit two circuits on the tray of limited size, the pair of spool structures on each side of the tray are close enough to each other such that a loop of fiber looped around a first of the pair of spool structures and having a bend radius greater than or equal to a minimum bend radius defined by the major axis of the spool structure partially overlaps a loop of fiber looped around the second of that pair of spool structures and having a bend radius greater than or equal to a minimum bend radius defined by the major axis of the second spool structure.

To further increase the splice capacity of a substantially oblong splice tray of a given size, the major axes of each of the oblong spool structures can be oriented obliquely to both the major and minor axes of the splice tray.

In another example of a two circuit splice tray, a total of two spool structures (one for each circuit) are supported on the major surface of the tray and each of two sets of splice holders (one for each circuit) is supported on one of a plurality of spool structures.

In some examples of multi-circuit trays, the tray includes one or more divider walls supported on the major surface that define pathways for fibers to be routed to the different circuits.

In some examples, the overall shape of the tray is adapted to permit finger access between a rear of the tray and a support rack of the closure that mounts the tray. The tray shape can facilitate feeding fibers from the cables to the appropriate tray on the support frame via fiber routing channels defined by the support rack.

In some examples, a tool is provided to route fibers from the cable to the appropriate tray mounted to the support rack via fiber routing channels defined by the support rack. According to one embodiment, the tool includes a routing portion having a curved fiber receiving groove having a radius of curvature that is greater than or equal to the minimum bend radius of the fiber. The groove can terminate in a tip having a threading eye. The tip can be configured to bend the fibers such that they are biased into the fiber routing channels of the support rack as the tool is moved up the channel with fiber threaded in the tip. In some examples, the tool can include right and left oriented routing portions that are mirror images of each other, such that the same tool can be used to feed fibers into fiber routing channels on each of two opposing sides of the support rack.

According to another aspect of the present disclosure, a splice tray kit includes one or more of the splice trays disclosed herein and a threading tool as disclosed herein.

According to another aspect of the present disclosure, a splice tray assembly includes a stack of the splice trays disclosed herein hingedly mounted to a support rack of a fiber optic splice closure. At least one input cable and at least one output cable are mounted to a portion of the closure and fibers from the input and output cables are spliced to each other on individual splice trays of the stack of splice trays.

The fiber optic splice trays of the present disclosure can be configured for retrofitting existing splice closure configurations, i.e., to fit within the interior volume dimensions and tray mounting specifications of existing splice closures.

Although the specific embodiments of the trays shown in the figures relate to spooling of individual fibers or groups of individual fibers as opposed to planar or ribbonized fibers, it should be appreciated that the trays of the present disclosure can be readily modified, e.g., by increasing the height of the walls and other structures protruding from the major surface of the tray, to accommodate other fiber configurations, such as ribbonized fibers.

According to another aspect of the present disclosure, a fiber optic splice tray comprises: a substantially oblong major surface defined by major and minor axes; first and second splice holder areas supported on the major surface and separated from each other, each of the first and second splice holder areas including a plurality of splice holders; a first spooling structure including a wall protruding from the major surface, the wall enclosing a substantially oblong shape defined by major and minor axes, the first spooling structure being associated with the first splice holder area; and a second spooling structure including a wall protruding from the major surface, the wall enclosing a substantially oblong shape defined by major and minor axes, the second spooling structure being associated with the second splice holder area; wherein a width of each of the spooling structures along the major axis of the spooling structure is greater than or equal to twice a minimum bend radius of optical fibers; and wherein the first and second spooling structures are sufficiently close together on the major surface such that loops of a first set of the optical fibers spooled around the first spooling structure and having a radius of curvature equal to one half the width of the first spooling structure partially overlap loops of a second set of the optical fibers spooled around the second spooling structure and having a radius of curvature equal to one half the width of the second spooling structure.

According to another aspect of the present disclosure, a method includes: feeding a first set of input fibers from an input cable mounted to a fiber optic closure through a first circuit input fiber pathway of a tray mounted to a support rack of the closure; organizing the first set of input fibers in one or more loops around an input spool structure of the first circuit; feeding a first set of output fibers from an output cable mounted to the fiber optic splice closure through a first circuit output fiber pathway of the tray; organizing the first set of output fibers in one or more loops around an output spool structure of the first circuit; feeding a second set of input fibers from the input cable through a second circuit input fiber pathway of the tray; organizing the second set of input fibers in one or more loops around an input spool structure of the second circuit such that one or more loops of the second set of input fibers at least partially overlap one or more loops of the first set of input fibers; feeding a second set of output fibers from the output cable through a second circuit output fiber pathway of the tray; and organizing the second set of output fibers in one or more loops around a second spool structure of the second circuit such that the loops of the second set of output fibers at least partially overlap the loops of the first set of output fibers.

In some examples, the method also includes splicing one or more of the first set of input fibers to one or more of the first set of output fibers and positioning splices of the spliced first circuit fibers in splice holders of a first circuit splice holder area disposed between the input spool structure of the first circuit and the output spool structure of the first circuit; and/or splicing one or more of the second set of input fibers to one or more of the second set of output fibers and positioning splices of the spliced second circuit fibers in splice holders of a second circuit splice holder area disposed between the input spool structure of the second circuit and the output spool structure of the second circuit.

In some examples, the method also includes connecting, via fiber optic connecters and adapters supported on the major surface of the tray, one or more of the first set of input fibers to one or more of the first set of output fibers and positioning connectors of the first circuit fibers in adapters of a first circuit connector area disposed between the input spool structure of the first circuit and the output spool structure of the first circuit; and/or connecting, via fiber optic connectors and adapters supported on the major surface of the tray, one or more of the second set of input fibers to one or more of the second set of output fibers and positioning connectors of the second circuit fibers in adapters of a second circuit connector area disposed between the input spool structure of the second circuit and the output spool structure of the second circuit.

According to another aspect of the present disclosure, a fiber optic splice tray comprises: a substantially oblong major surface defined by major and minor axes; first and second splice circuits supported on the major surface, each of the first and second splice circuits comprising: a splice holder area supported on the major surface and including a plurality of splice holders, the splice holder areas of the first and second circuits being separated from each other; a first spooling structure including a wall protruding from the major surface, the wall enclosing a substantially oblong shape defined by major and minor axes; and a second spooling structure including a wall protruding from the major surface, the wall enclosing a substantially oblong shape defined by major and minor axes; wherein the splice holder area, the first spooling structure and the second spooling structure of the first circuit are substantially aligned on the major surface; and wherein the splice holder area, the first spooling structure and the second spooling structure of the second circuit are substantially aligned on the major surface.

As indicated above, in addition, or as an alternative, to trays that support splice holders, the trays of the present disclosure can support fiber optic adapters or other connector couplers to enable connector to connector optical pathways on the tray. Thus, for example, fiber optic connectors (rather than splices) can be used to connect input fibers to output fibers in a first circuit supported on a tray, and/or fiber optic connectors can be used to connect input fibers to output fibers in a second circuit supported on the same tray. The dimensions and configuration of the trays disclosed herein can provide adequate space on the tray to access (e.g., finger access) to manage (e.g., connectorize and de-connectorize) connectors in one or more connector holder areas of the tray. Thus, one or more of the splice holder areas of the trays of the present disclosure can be replaced with one or more connector holder areas having a plurality of connector holders such as fiber optic adapters.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
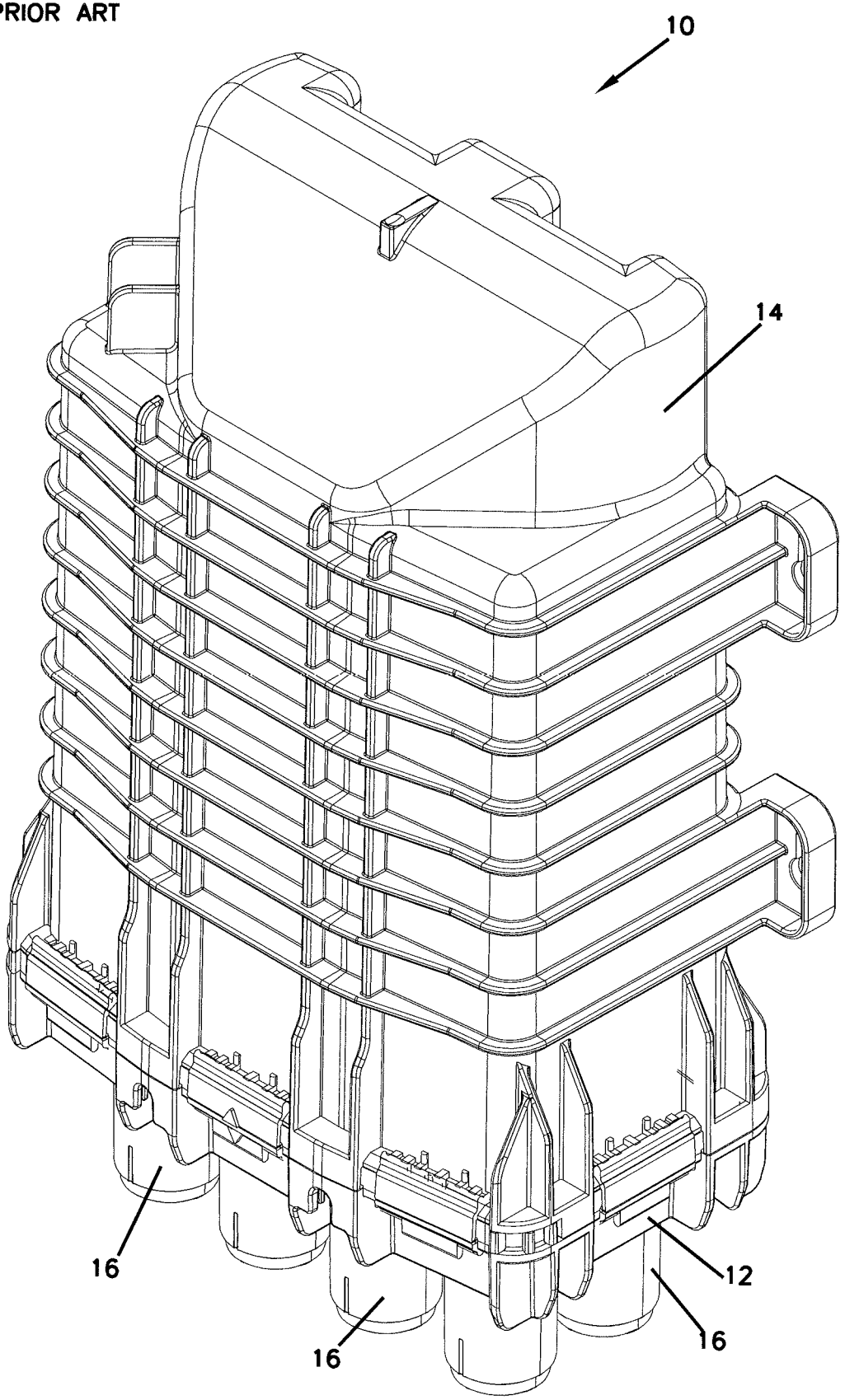
FIG. 1 is a perspective view of an example prior art fiber optic splice closure.
Figure 2:
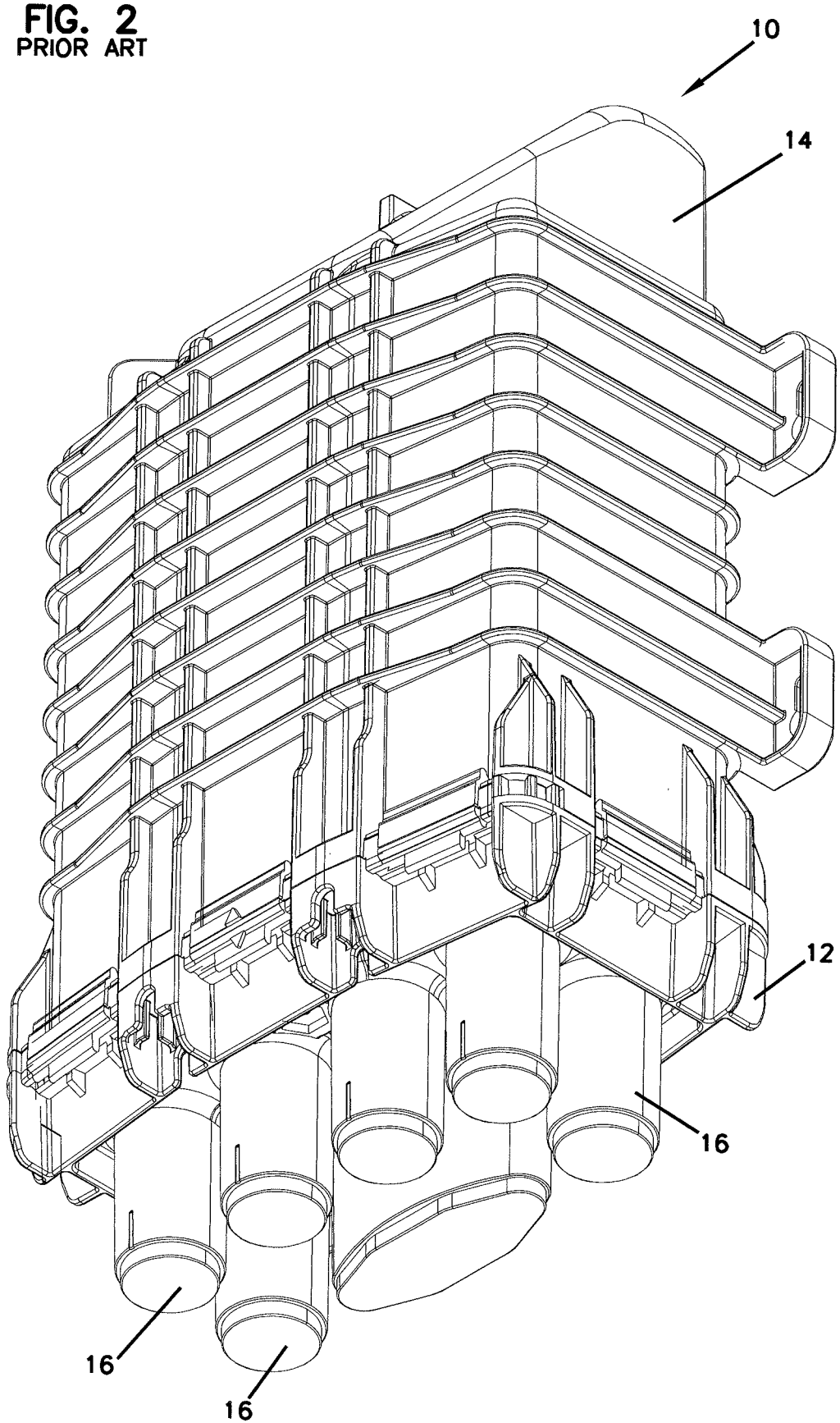
FIG. 2 is a further perspective view of the prior art fiber optic splice closure of FIG. 1.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring to FIGS. 1-5, a prior art fiber optic splice closure 10 includes a base 12 and a cover 14 that cooperate to seal off an interior volume 18 of the closure 10. A plurality of ports 16 in the base 12 can be optionally sealed off or opened to receive fiber optic cables, such as fiber optic trunk cables, drop cables, and so forth, including the input and output cables described herein. Each port 16 can accommodate one or more cables. The ports 16 can include sealing elements to seal off the cables as they enter the interior volume 18.

In some examples a top portion of the interior volume 18 is defined by a reduced profile portion 17 of the cover 14.

A splice tray support rack 20 is attached to the base 12. The rack 20 includes legs 22 that support a panel 24. In some examples, the legs 22 can also support a fiber rerouting system 15. The panel 24 includes a series of splice tray receiving structures or sockets that are complementary to the pins 30 on the splice trays 40, such that each splice tray receiving structure hingedly couples to the back or hinged portion 42 of a splice tray 40. Each splice tray receiving structure can also include a retaining member adapted to abut the tab 32 on the splice tray 40 to help keep the pins 30 in their sockets. Disengaging the tab 32 from the retaining member can facilitate removal of the tray 40 from the panel 24. The hinged portion 42 of each splice tray 40 is opposite a front 44 of the splice tray 40.

The support panel 24 can support a stack 50 of splice trays 40, one on top of the other. Due to the hinged coupling of the splice trays 40 to the panel 24, one or more of the splice trays can be pivoted (substantially upward in FIG. 3) to gain access to another splice tray in the stack 50 on which to splice fibers.

Fibers from cables entering the closure can be fed through vertical channels 60 and 62 on opposing sides of the panel 24 up to a height on the panel corresponding to the appropriate splice tray 40 on which the fibers are to be spliced. Feeding the fibers through the channels 60 and 62 typically occurs starting from the bottom of the channels and working upwards. One of the vertical channels 60 or 62 can be used for fibers from input cables, while the other of the channels can be used for fibers from output cables, though fibers can be re-routed on the splice trays as well such that, e.g., fibers fed up one of the channels can be spliced to each other on the tray.

A fiber rerouting system 15 can route fibers entering the closure on one side to a vertical channel on the other side, as needed.

Each splice tray 40 includes a major surface 46 on the upper side of the tray. Fibers are routed from a channel 60 or 62 onto the splice tray 40 through one of the entryways 48, 49 on either side of the hinged portion 42. Typically, fibers fed through the right channel will be routed to the left entryway and fibers fed through the left channel will be routed through the right entryway so as to prevent overbending of the fibers.

Once in the entryways 48, 49, the fibers are routed through one of the curved passageways 70, 72. The passageways 70, 72 are defined by walls 74, 75, 76, and 77 protruding from the major surface 80 of the splice tray 40.

The passageway 70 is in communication with a splice holder area 90 of the tray 40, and also a fiber organizing area 91 of the tray 40. The passageway 72 is in communication with the splice holder area 90, and also with the fiber organizing area 91 of the tray 40.

The splice holder area 90 includes a plurality of splice holders 92 adapted to hold and protect splices connecting input fibers to output fibers on the tray 40.

The organizing area 91 includes a spooling structure 102 consisting of first and second islands 93, 94 protruding from the major surface 80. One or more loops of fiber can be organized around the entire spooling structure 102, i.e., around both islands 93, 94. For a given fiber, loop direction around the spooling structure 102 can be switched (from clockwise to counterclockwise or vice versa) using one of the loop pathways 95, 96 between the islands 93, 94, and the gap 97 that connects the loop pathways 95 and 96.

One or more fingers 99 elevated relative to the major surface 80 can help keep the organized fibers within the volume defined between the major surface 80 and the fingers 99 and to minimize the chances of fibers or portions of fibers escaping the tray 40. One or more openings 98 in the major surface 80 corresponding to the fingers 99 are formed during the process of molding the tray 40. Indentations 100 formed in the islands 93, 94 can facilitate navigating the fibers around the fingers when looping them on the spooling structures.

Due to the layout and structural configuration of the splice tray 40, the splice tray 40 can hold a maximum of 12 splices in the splice holder area 90 and organize a maximum of 12 input fibers and 12 output fibers in the organizing area 91. In effect, the splice tray 40 accommodates a single 12-fiber circuit. Since the closure 10 can hold only a finite number of trays 40, the number of splices and splice circuits that can be accommodated by the closure 10 is correspondingly limited to the number of splices and splice circuits on each tray.

Figure 6:
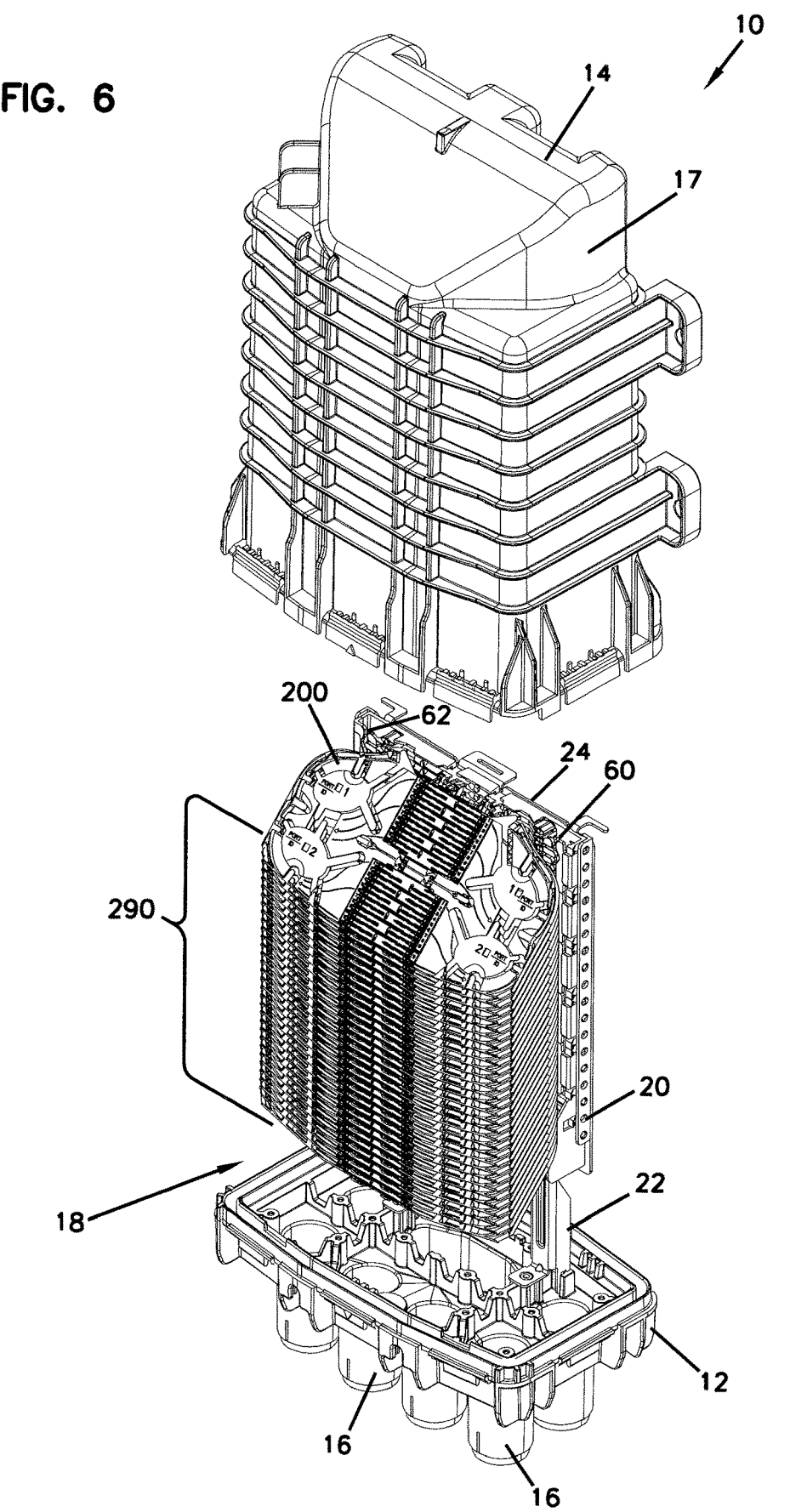
FIG. 6 is an exploded view of a fiber optic splice closure including a stack of example trays according to an embodiment of the present disclosure.
Figure 7:
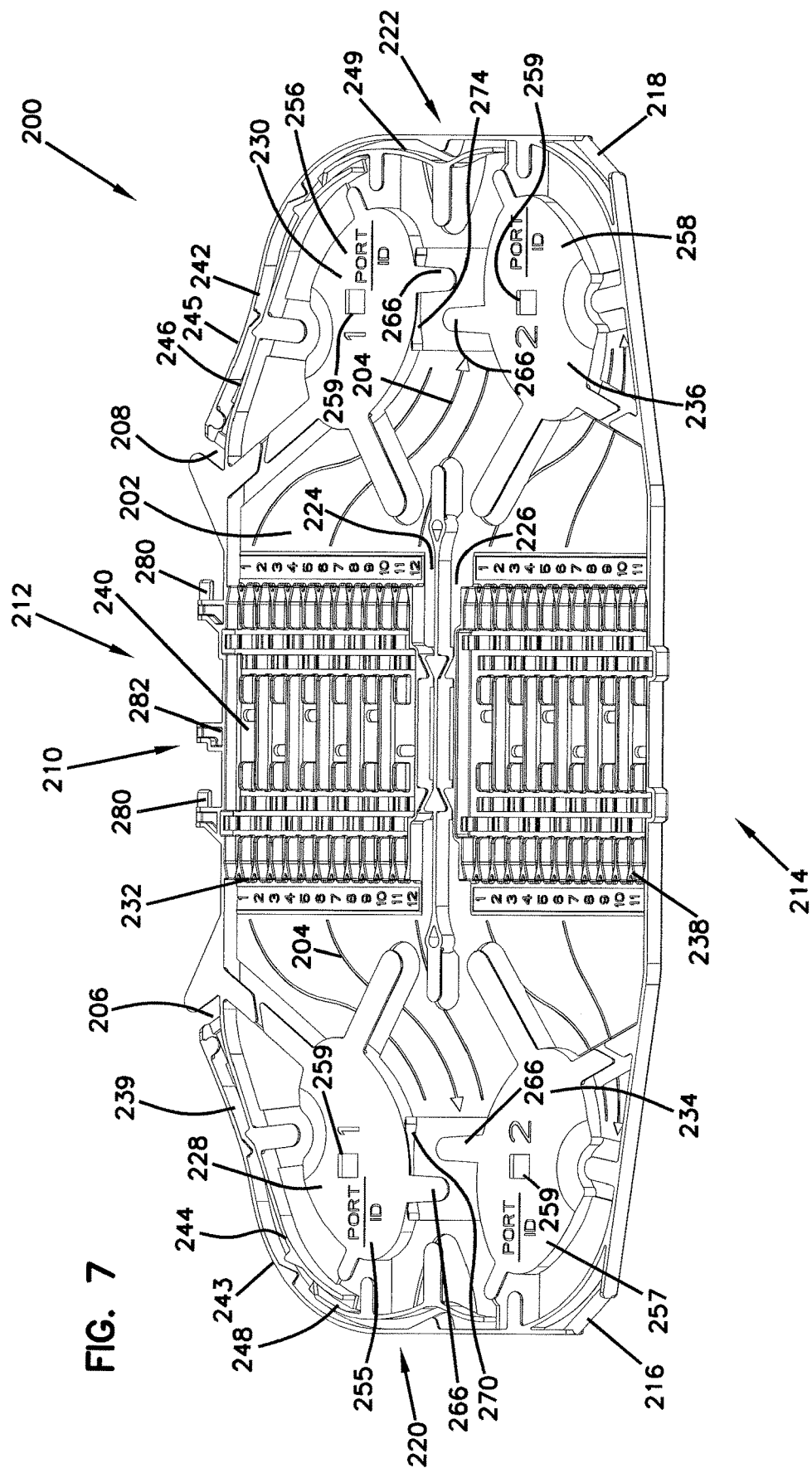
FIG. 7 is a top, perspective view of one of the splice trays of FIG. 6.
Figure 8:
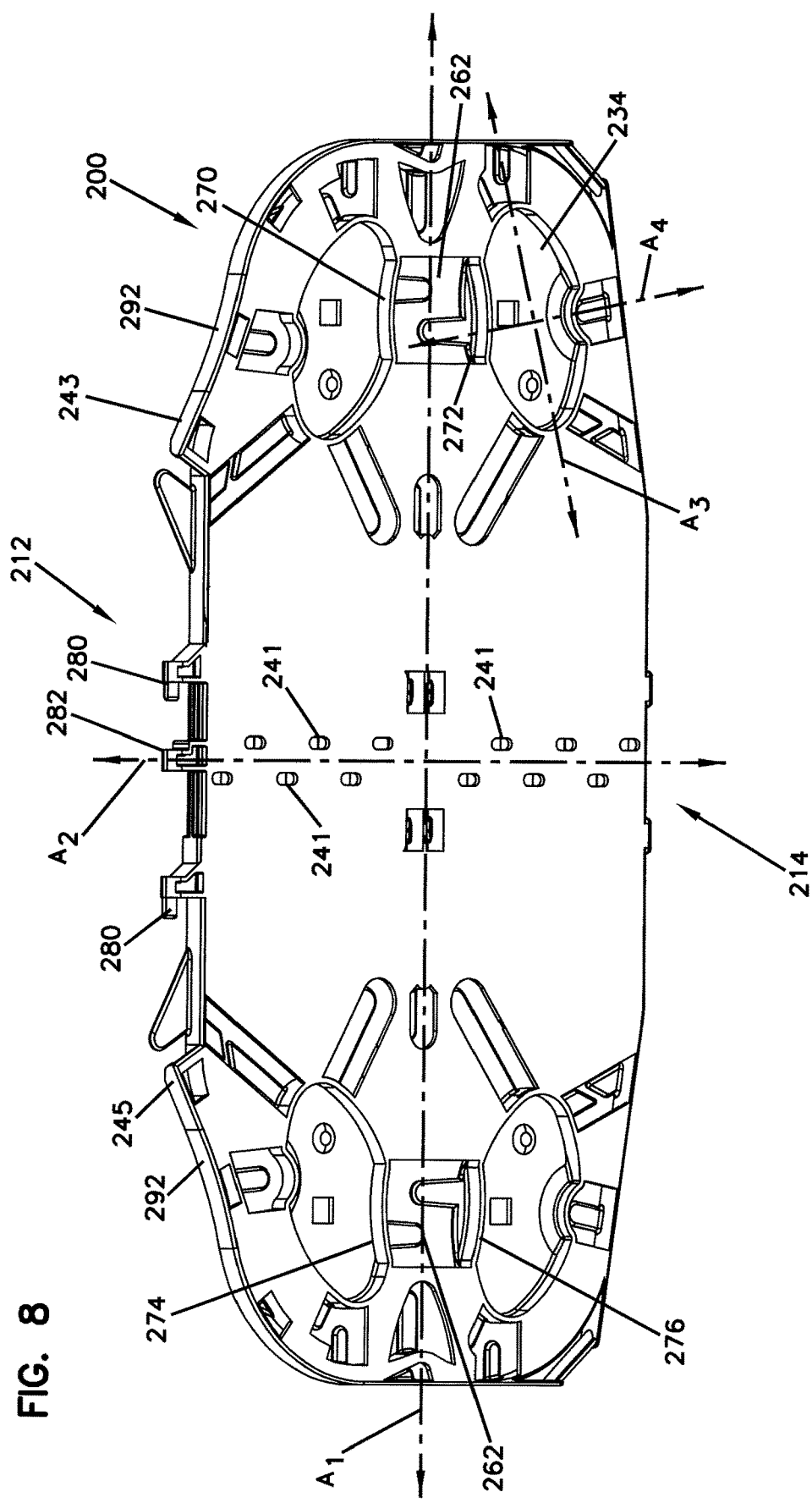
FIG. 8 is a bottom, perspective view of the splice tray of FIG. 7.
Figure 9:
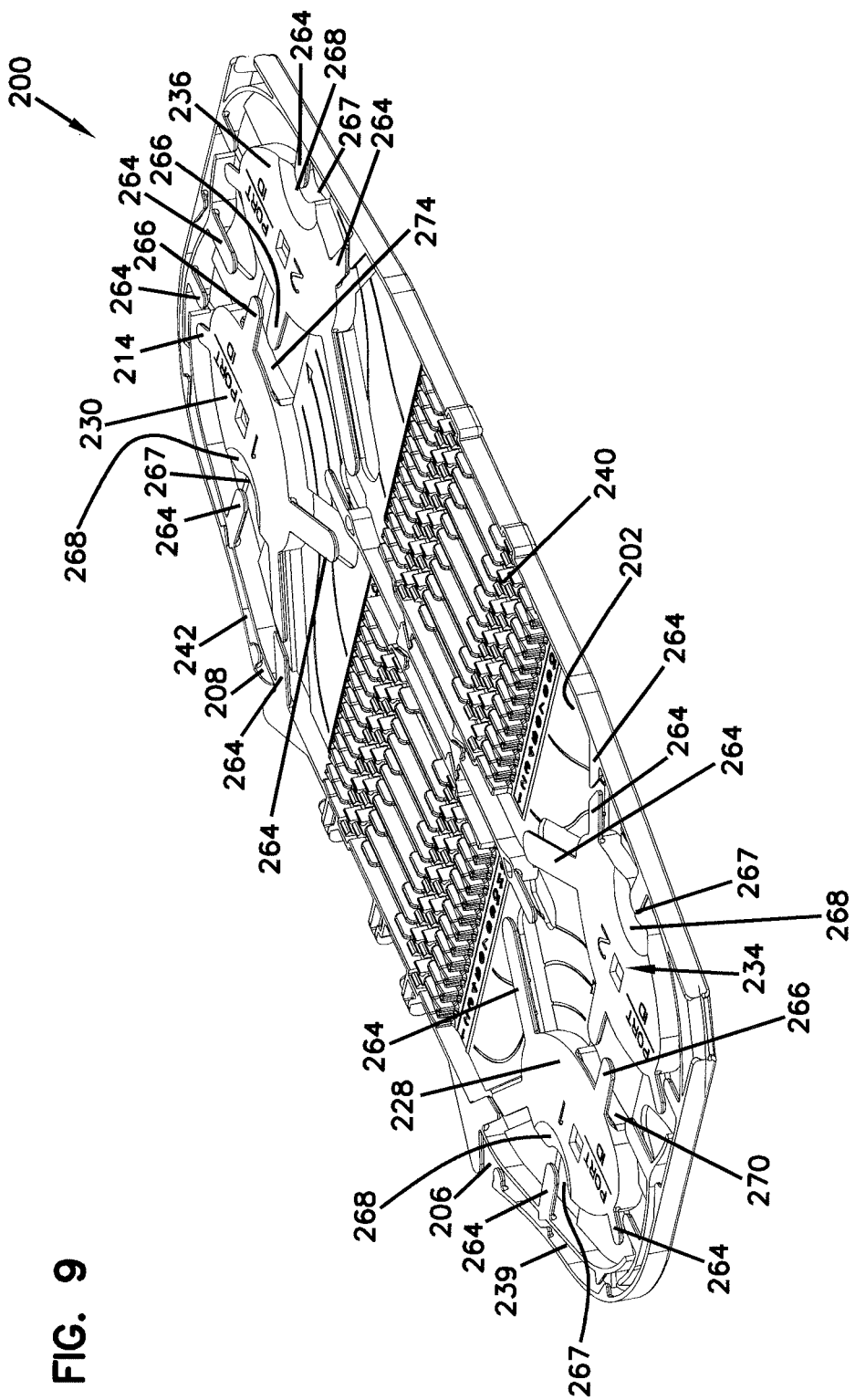
FIG. 9 is a further top perspective view of the splice tray of FIG. 6.
Figure 10:
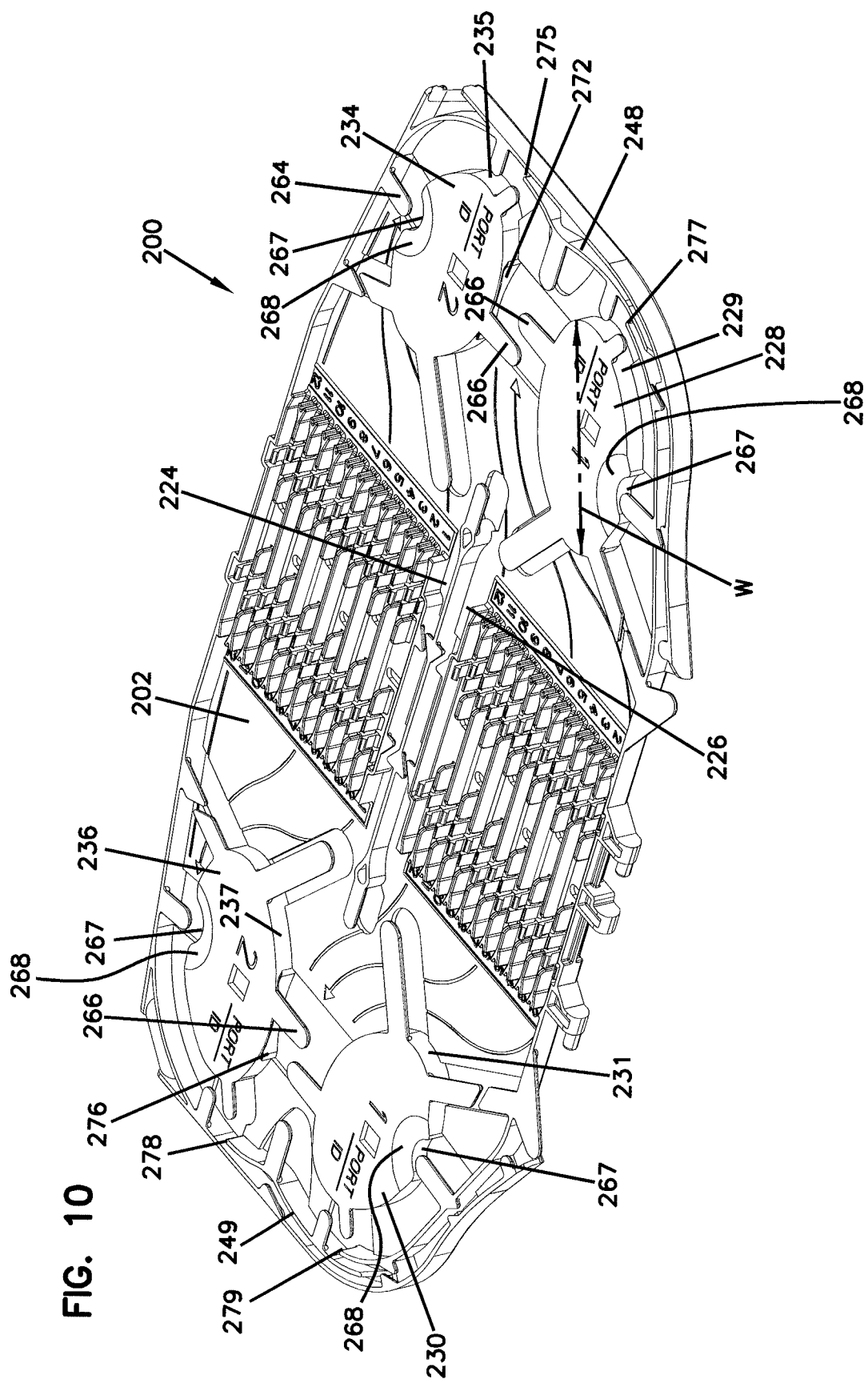
FIG. 10 is a further top perspective view of the splice tray of FIG. 6.

FIG. 6 is an exploded view of a fiber optic splice closure 10 including a stack 290 of example splice trays 200 according to a first embodiment of the present disclosure. FIG. 7 is a top, perspective view of one of the splice trays 200 of FIG. 6. FIG. 8 is a bottom, perspective view of the splice tray 200 of FIG. 7. FIG. 9 is a further top perspective view of the splice tray 200 of FIG. 6. FIG. 10 is s further top perspective view of the splice tray 200 of FIG. 6.

Referring to FIGS. 6-10, the splice tray 200 is adapted to fit within the interior volume 18 of the closure 10. Moreover, the closure 10 can accommodate as many of the splice trays 200 as it can of the splice trays 40. However, advantageously each splice tray 200 includes two circuits, each of the two circuits including up to 12 splices between a total of up to 24 input fibers and 24 output fibers. Thus, for a given number of splice trays 40, 200 in a closure 10, the splice capacity per closure 10 can be doubled using the splice tray 200 instead of the splice tray 40.

Optionally, the splice tray 200 is molded, e.g., injection molded, as a rigid plastic.

In addition to increasing splice capacity for a given closure, supporting multiple circuits on the same splice tray can provide for more practical fiber organization schemes. For example, input and output cables can sometimes include bundles of fibers loosely held in flexible sheaths. Each sheath can hold, e.g., 6 fibers or 12 fibers, or some other number of fibers. It can be efficient or otherwise beneficial to pair fibers of certain sheaths on the same splice try. Thus, for example, the first circuit of the splice tray 200 can correspond to the fibers of first sheaths in each of an input and output cable, while the second circuit of the splice tray 200 can correspond to the fibers of second sheaths of each of the input and output cable, particularly when it is desirable to work with the fibers from the first and second sheaths at the same time.

A splice tray support rack 20 is attached to the base 12. The rack 20 includes legs 22 that support a panel 24. The panel 24 includes a series of splice tray receiving structures or sockets that are complementary to the pins 280 on the splice trays 200, such that each splice tray receiving structure hingedly couples to the back or hinged portion 210 of a splice tray 200. Each splice tray receiving structure can also include a retaining member adapted to abut the tab 282 on the splice tray 200 to help keep the pins 280 in their sockets. Disengaging the tab 282 from the retaining member can facilitate removal of the tray 200 from the panel 24. The splice tray receiving structures are provided in substantially horizontal rows on the rack 20, the rows positioned sequentially one on top of another. A single splice tray 200 can be hingedly mounted in each of the rows.

Thus, the support panel 24 can support a stack 290 of splice trays 200, one on top of another. Due to the hinged coupling of the splice trays 200 to the panel 24, one or more of the splice trays can be pivoted (substantially upward in FIG. 6) to gain access to another splice tray in the stack 290 on which to splice fibers, remove splices, fix splices, etc.

The splice tray 200 includes a major surface 202 on the upper side of the tray. Optionally, indicia (e.g., arrows) 204 can be included on the major surface to assist in routing fibers. Fibers are routed from a channel 60 or 62 onto the splice tray 200 through one of the entryways 206, 208 on either side of the hinged portion 210 at the rear 212 of the splice tray 200. Additional entryways 216 and 218 at the front 214 of the tray 200 can optionally be provided. Fibers fed through the right channel 60 can be routed to the left entryway 206 and fibers fed through the left channel 62 can be routed through the right entryway 208 so as to prevent over-bending of the fibers.

The tray 200 includes an input fiber side 220 and an output fiber side 222, though it should be appreciated that one or more pathways can be provided on the tray 200 to enable routing of fibers between the two sides 220 and 222, such as the cross-tray channels 224 and 226.

The tray 200 includes two splice circuits. The first circuit is disposed towards the rear 212 of the tray 200 (i.e., towards the hinged portion 210) and the second circuit is disposed towards the front 214 of the tray 200. The first circuit includes an input spooling structure 228 and an output spooling structure 230 each protruding upwards from the major surface 202, with a first circuit splice holder area 232 disposed between them. The second circuit includes an input spooling structure 234 and an output spooling structure 236 each protruding upwards from the major surface 202, with a second circuit splice holder area 238 disposed between them.

More specifically, each spooling structure 228, 230, 234, 236 comprises a wall 229, 231, 235, 237, respectively, protruding upward from the major surface 202. Each wall 229, 231, 235, 237 defines a closed and substantially oblong shape defined by major and minor axes. For example, each of the spooling structures 228, 230, 234, 236 is defined by major and minor axes $A_3$ and $A_4$, respectively (see FIGS. 8, 17). Each wall 229, 231, 235, 237 includes an outer surface facing substantially away from the center of the oblong shape defined by the wall, and optical fibers are looped around the outer surfaces of the walls 229, 231, 235, 237.

Optionally, each spooling structure 228, 230, 234, 236, includes a surface 255, 256, 257, 258, respectively, that is substantially parallel to, and elevated relative to, the major surface 202. Optionally, one or more of the surfaces 255, 256, 257, 258 can include one or more latch elements 259 adapted to reversibly couple a cover (not shown) to the tray 200 in order to protect the fibers and splices held on the tray.

To further increase the splice capacity of the substantially oblong splice tray 200 having a given size, the major axes of each of the oblong spooling structures 228, 230, 234, 236 can be oriented obliquely to both the major and minor axes $A_1$ and $A_2$, respectively, of the splice tray (FIG. 8).

The cross-tray channel 224 connects areas of the first circuit on either side of the first circuit splice holder area 232. The cross-tray channel 226 connects areas of the second circuit on either side of the second circuit splice holder area 238.

Each splice holder area 232, 238 includes a plurality of splice holders 240 adapted to hold and protect splices connecting input fibers to output fibers on the tray 200. In this example, each splice holder area 232, 238 includes 12 splice holders 240 for holding up to 12 splices per circuit for a total of 24 splices on the tray 200. The splice holder area 232 holds splices for the input and out fibers of the first circuit, while the splice holder area 238 holds splices for the input and output fibers of the second circuit. The splice holder area 232 is thus generally aligned with the fiber organizing structures 228 and 230 of the first circuit, while the splice holder area 238 is generally aligned with the fiber organizing structures 234 and 236 of the second circuit.

Holes 241 (FIG. 8) through the major surface and aligned with splice holders 240 can facilitate removal of splices from the underside of the tray 200, e.g., by inserting a tool into a hole 241 to pop out a splice from a splice holder 240.

Once in the entryways 206, 208, the fibers are routed through one of the curved passageways 239, 242. The passageways 239, 242 are defined by walls 243, 244, 245, 246 protruding from the major surface 202 of the splice tray 200. Each passageway 239, 242 bifurcates into two passageways by a divider wall 248, 249. On one side of the divider wall 248, 249, the fibers are directed into the first circuit via one of the exits 275, 278, and on the other side of the divider wall the fibers are directed further towards the front 214 of the tray 200 and into the second circuit via one of the exits 277, 279.

The passageway 239 is thus in communication with the input fiber organizing areas 250 and 251 of the first and second circuits, respectively; and the passageway 242 is in communication with the output fiber organizing areas 252 and 253 of the first and second circuits, respectively.

Optionally, each of the outer walls 243, 245 towards the rear 210 of the splice tray 200 can include a concave portion 292, i.e., a portion that is bowed in towards the front 214 of the tray. The concave portions 292 can, e.g., allow finger access to the vertical channels 60 and 62 on either side of the splice tray support rack 20 to facilitate in feeding fibers from cables entering the closure 10 to the appropriate splice tray 200 held within the closure.

One or more loops of fiber can be organized around each spooling structure 228 and 230 in the first circuit, and one or more loops of fiber can be organized around each spooling structure 234 and 236 in the second circuit. Specifically, the loops of fiber are organized around the outer surfaces of the walls 229, 231, 235, 237 of the spooling structures.

In order to fit two circuits on the tray 200, the fiber organizing structures 228 and 234 are close enough to each other on the tray 200 such that a loop of fiber looped around the fiber organizing structure 228 and having a bend radius greater than or equal to a minimum bend radius defined by the major axis of the fiber organizing structure 228 partially overlaps a loop of fiber looped around the fiber organizing structure 234 and having a bend radius greater than or equal to a minimum bend radius defined by the major axis of the fiber organizing structure 234.

Similarly, on the side 222 of the tray 200, in order to fit two circuits on the tray 200, the fiber organizing structures 230 and 236 are close enough to each other such that a loop of fiber looped around the fiber organizing structure 230 and having a bend radius greater than or equal to a minimum bend radius defined by the major axis of the fiber organizing structure 230 partially overlaps a loop of fiber looped around the fiber organizing structure 236 and having a bend radius greater than or equal to a minimum bend radius defined by the major axis of the fiber organizing structure 236.

Figure 17:
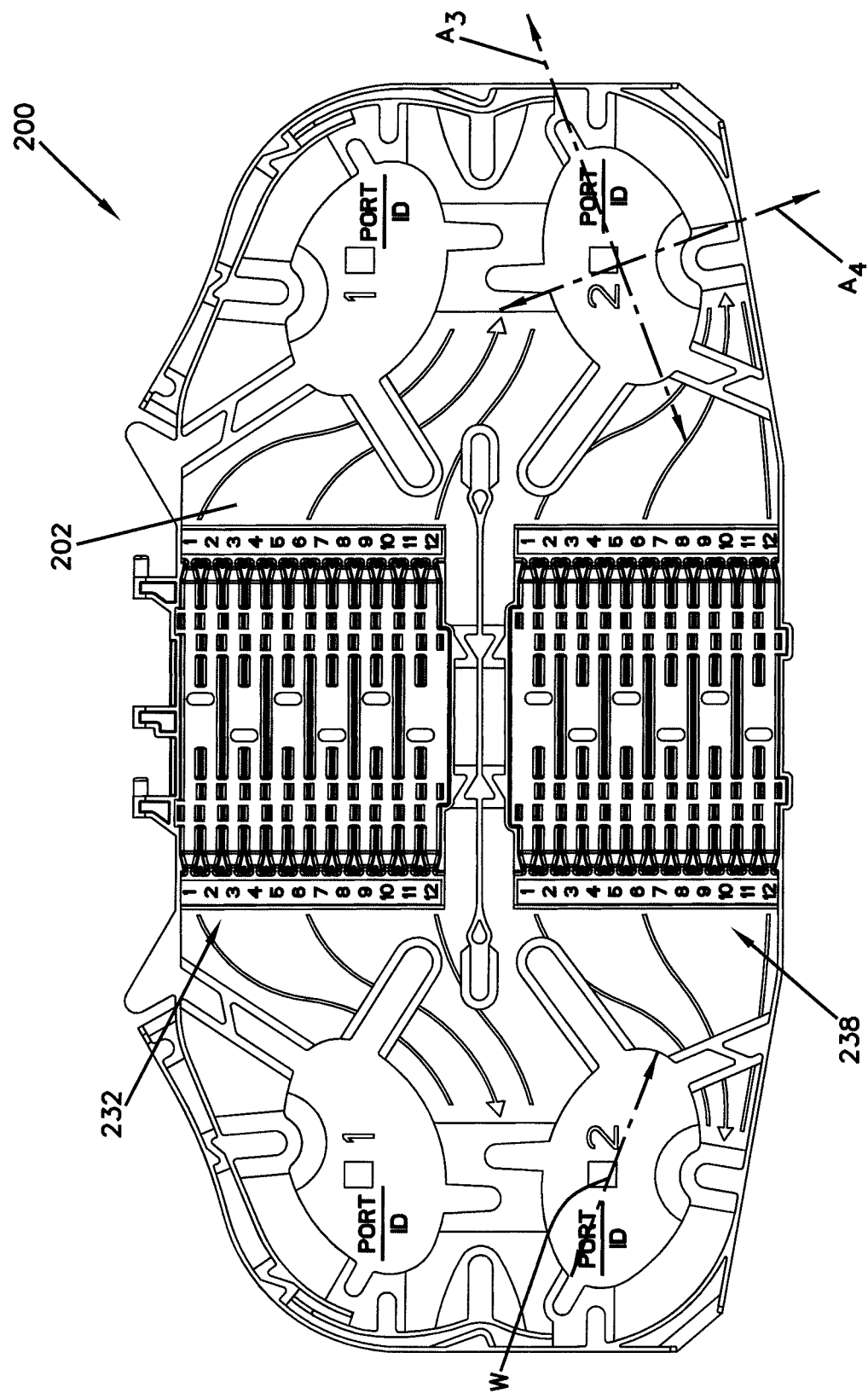
FIG. 17 is a top view of the example fiber optic splice tray of FIG. 7 without fibers.

It should be appreciated that, as used herein, a bend radius defined by a major axis of a fiber organizing structure is equal to or approximately equal to one half of the greatest width of that fiber organizing structure as measured in a plane parallel to the major surface 202. Thus, for example, the bend radius defined by the major axis of the fiber organizing structure 228 is equal to or approximately equal to ½ w (FIGS. 10, 17). In some examples, the width w is the same for each of the fiber organizing structures 228, 230, 234, and 236. In some examples w is approximately 40 mm, corresponding to minimum bend radius for the fibers of 20 mm, though w can be greater or smaller depending on the operating specifications of the fibers being used.

In some examples, in order to accommodate the overlapping loops of fibers on each side 220, 222 of the tray 200, the fiber organizing structures 228, 230, 234, 236 each include a recess 270, 272, 274 and 276 in the wall of the organizing structure extending from the major surface 202. On the side 220 the recesses 270 and 272 oppose each other. On the side 222, the recesses 274 and 276 oppose each other.

The recess 270 is adapted to receive portions of fibers looped around the fiber organizing structure 234. The recess 272 is adapted to receive portions of fibers looped around the fiber organizing structure 228. The recess 274 is adapted to receive portions of fibers looped around the fiber organizing structure 236. The recess 276 is adapted to receive portions of fibers looped around the fiber organizing structure 230. Thus, the recesses 270, 272, 274, 276 and 278 enable the fiber organizing structures on each side of the tray 200 to coordinate with each other to maximize space efficiency on the tray for looped fibers of multiple circuits.

Since the recesses 270, 272, 274, and 276 can receive portions of fiber loops, they are curved and defined by a radius of curvature that is greater than or equal to the radius of curvature of the fiber loop. Thus, for example, the radius of curvature of each of the recesses 270, 272, 274, 276 can be greater than or equal to ½ w, where the curvature of the recess relates to the curvature of the wall 229, 231, 235, 237, respectively, of the fiber organizing structure extending from the major surface 202 in the region of the recess.

One or more fingers 264 elevated relative to the major surface 202 can help keep the organized fibers within the volume defined between the major surface 202 and the fingers 264 and to minimize the chances of fibers or portions of fibers escaping the tray 200.

Indentations 267 and sloped sides 268 formed in the fiber organizing structures 228, 230, 234, 236 can facilitate navigating the fibers around the fingers 264 when looping them on the fiber organizing structures.

In addition, each fiber organizing structure 228, 230, 234, 236 can be provided with a finger 266 above its respective recess 270, 274, 272, 276 to help keep the overlapping loop portions of the fiber loops within the tray 200. On each side 220, 222 of the tray 200, opposing fingers 266 can be offset relative to each other in relation to the major axis $A_1$ of the splice tray 200 to facilitate navigation of the fiber loops within each recess. As described above, the splice tray 200 is substantially oblong and defined by a minor axis $A_2$ that is perpendicular to its major axis $A_1$.

One or more openings 262 in the major surface 202 corresponding to the fingers 266 can be formed during the process of molding the tray 200. The offset, opposing orientation of the fingers 266 relative to each other results in relatively large openings 262 in the major surface 202. The relatively large size of the openings 262 can facilitate routing of the fibers on the major surface 202 in that, e.g., portions of the fibers can be disposed slightly below the major surface 202 within the openings 262.

Figure 3:
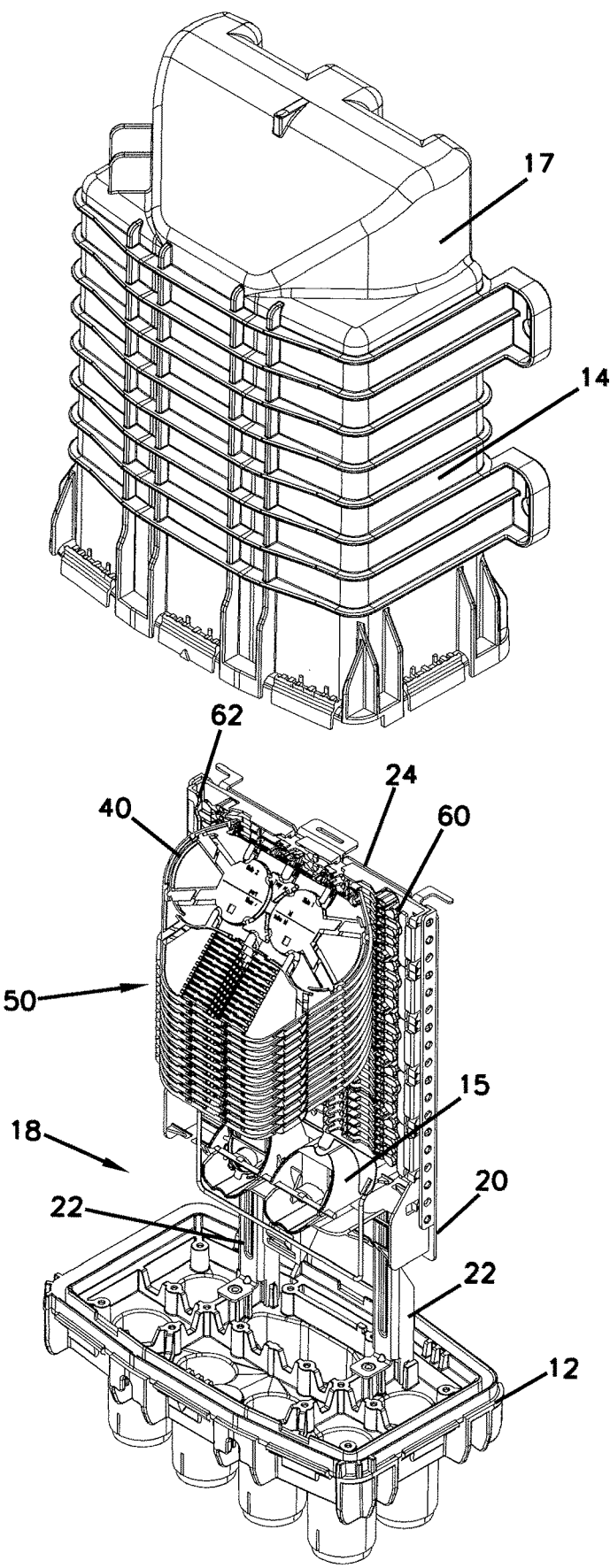
FIG. 3 is an exploded view of the prior art fiber optic splice closure of FIG. 1 including a plurality of prior art splice trays.
Figure 4:
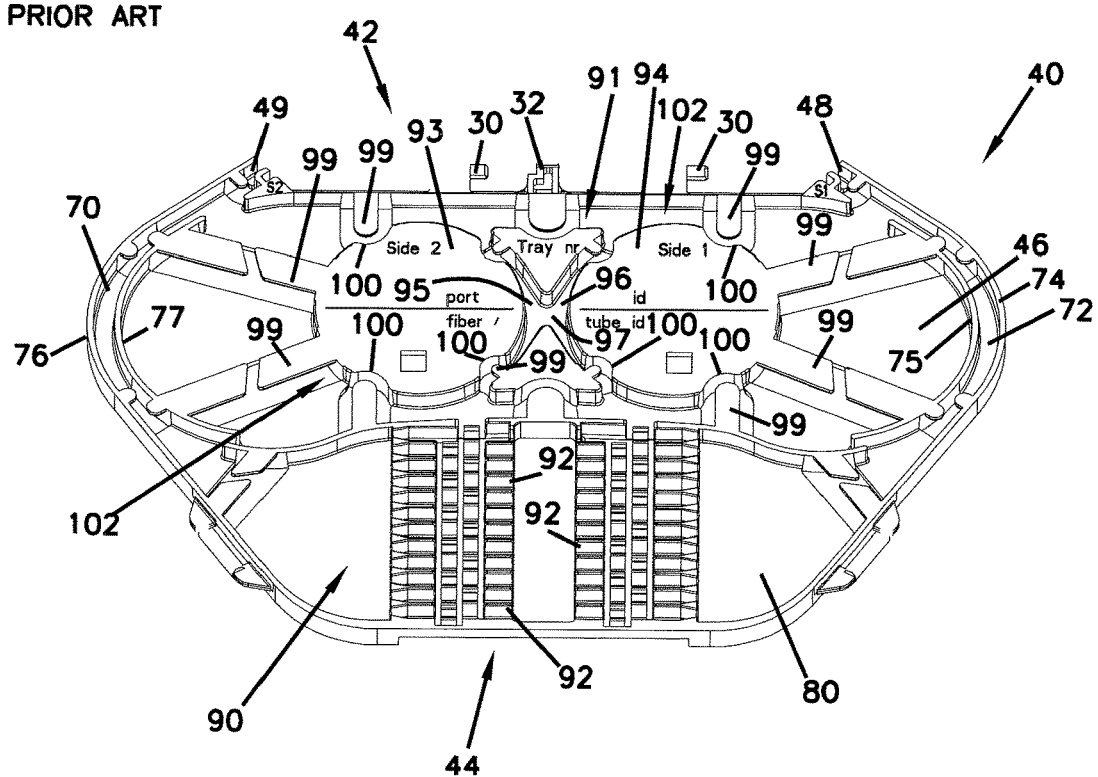
FIG. 4 is a top perspective view of one of the prior art splice trays of FIG. 3.
Figure 5:
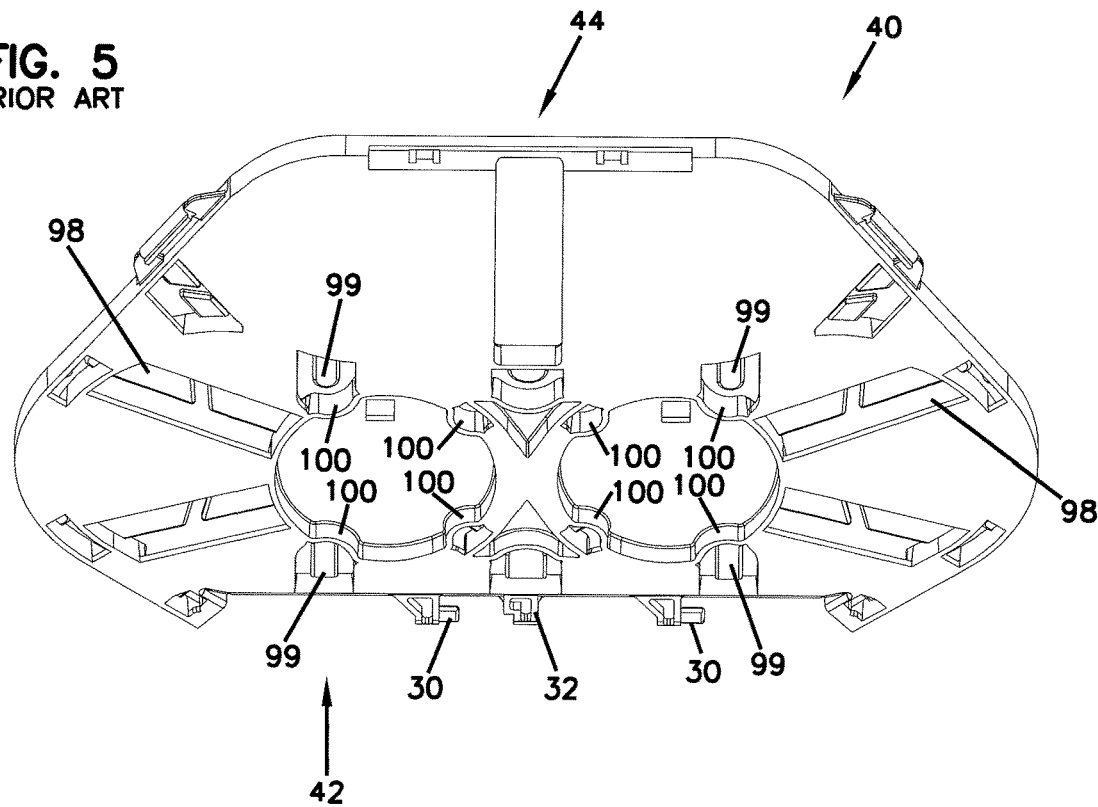
FIG. 5 is a bottom perspective view of the prior art splice tray of FIG. 4.
Figure 11:
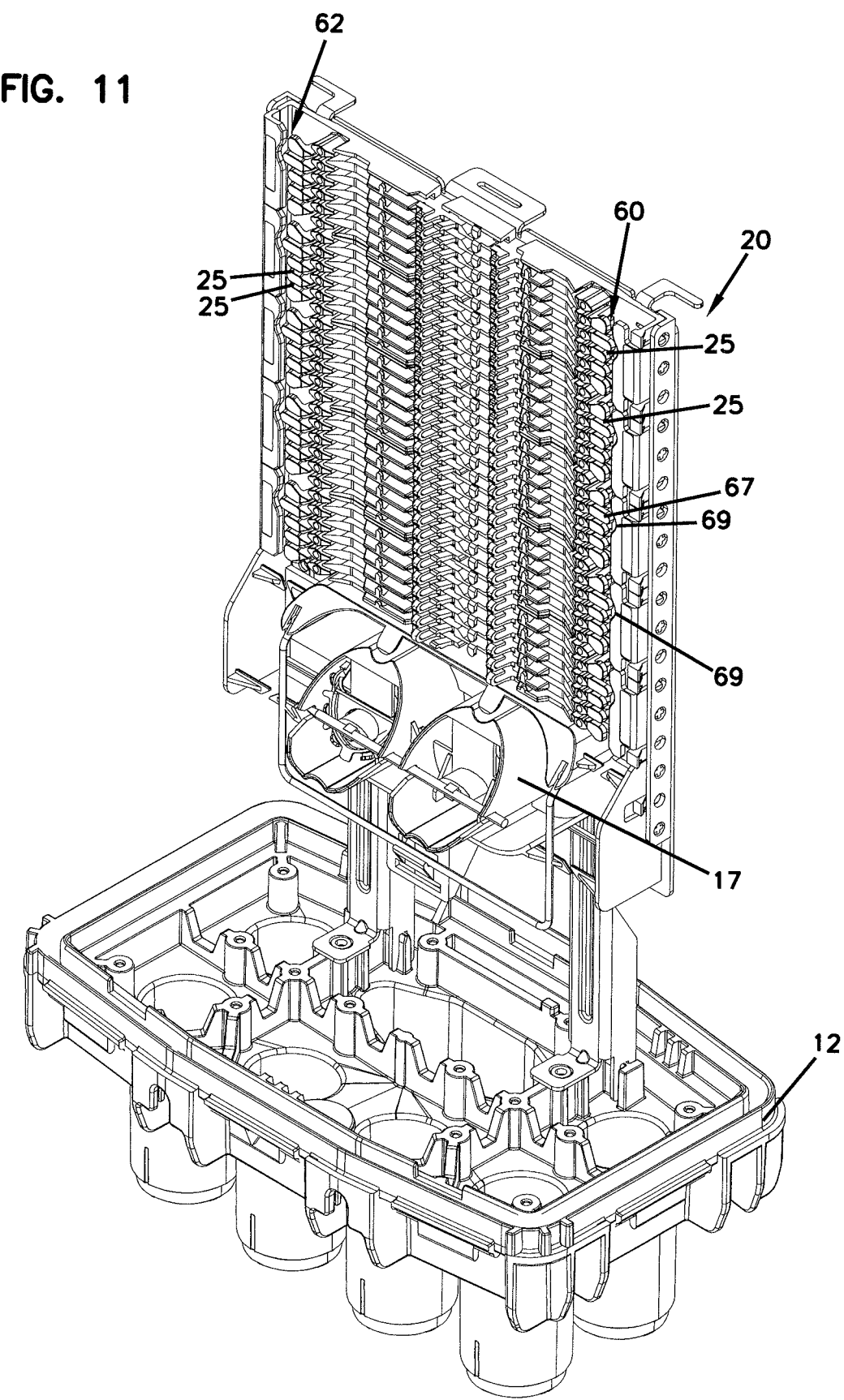
FIG. 11 is a perspective view of a portion of the fiber optic splice closure of FIG. 6, without the cover and without splice trays, and including a fiber rerouting system.

Optionally, though not shown, a fiber rerouting system, such as the fiber rerouting system 15 shown in FIG. 3, can be disposed above the top tray of the tray stack 290 (i.e., above the panel 24) and adapted to fit within the interior volume defined by the reduced profile portion 17 of the cover 14. In alternative configurations, the fiber rerouting system 15 can optionally be disposed below the stack 290 of trays 200 as shown in FIG. 11. In some examples, the trays 200 are sized such that those towards the top of the stack 290 are adapted to fit within the interior volume defined by the reduced profile portion 17 of the cover 14.

Figure 16:
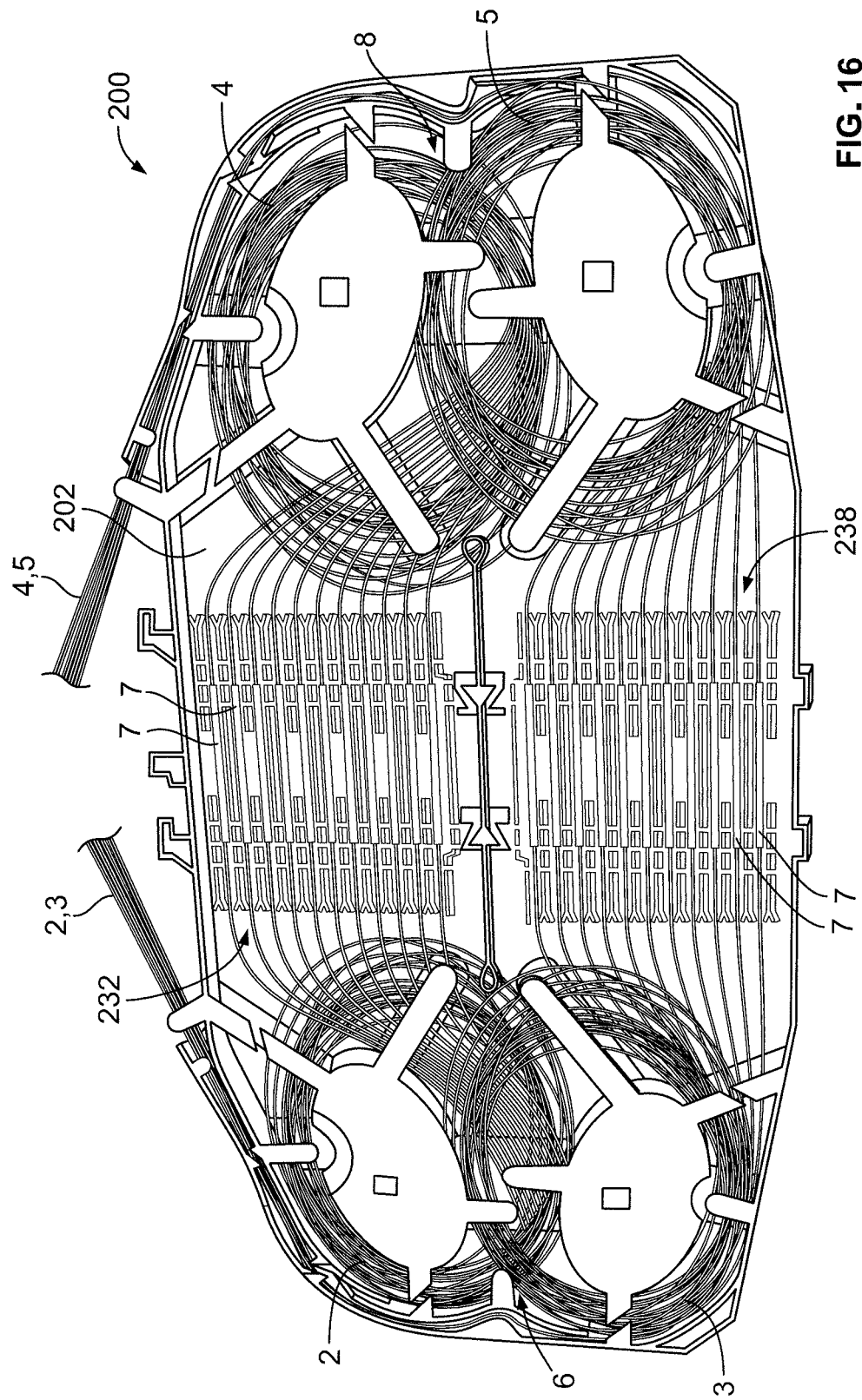
FIG. 16 is a top view of the example fiber optic splice tray of FIG. 7 depicting an example fiber routing scheme on the tray.

Referring to FIG. 16, an example fiber routing scheme is depicted on a splice tray 200. First and second sets 2, 3 of input fibers are organized around the spooling structures on the left side of the tray with the sets 2, 3 overlapping each other in an input fiber overlap region 6. Similarly, first and second sets 4, 5 of output fibers are organized around the spooling structures on the right side of the tray with the sets 4, 5 overlapping each other in an output fiber overlap region 8. The first set 2 of the input fibers are spliced to the first set 4 of the output fibers using splice units 7 held in the splice holders of the first circuit splice holder area 232. The second set 3 of the input fibers are spliced to the second set 5 of the output fibers using splice units 7 held in the splice holders of the second circuit splice holder area 238.

Figure 12:
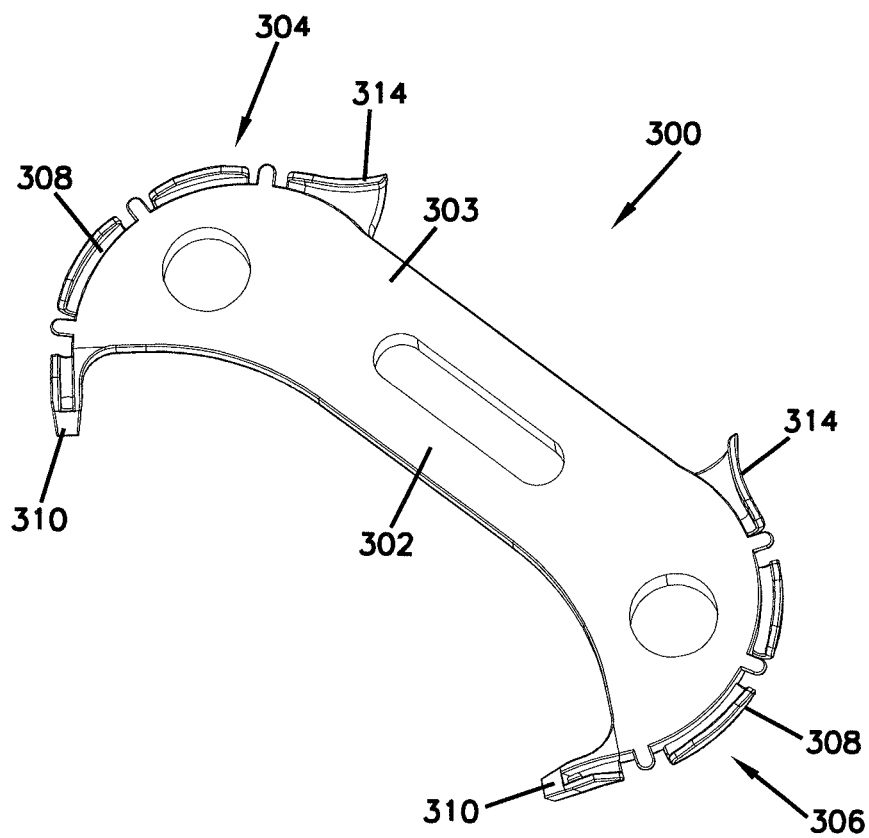
FIG. 12 is a top perspective view of an example fiber threading tool that can be used with the closures and splice trays of the present disclosure.
Figure 13:
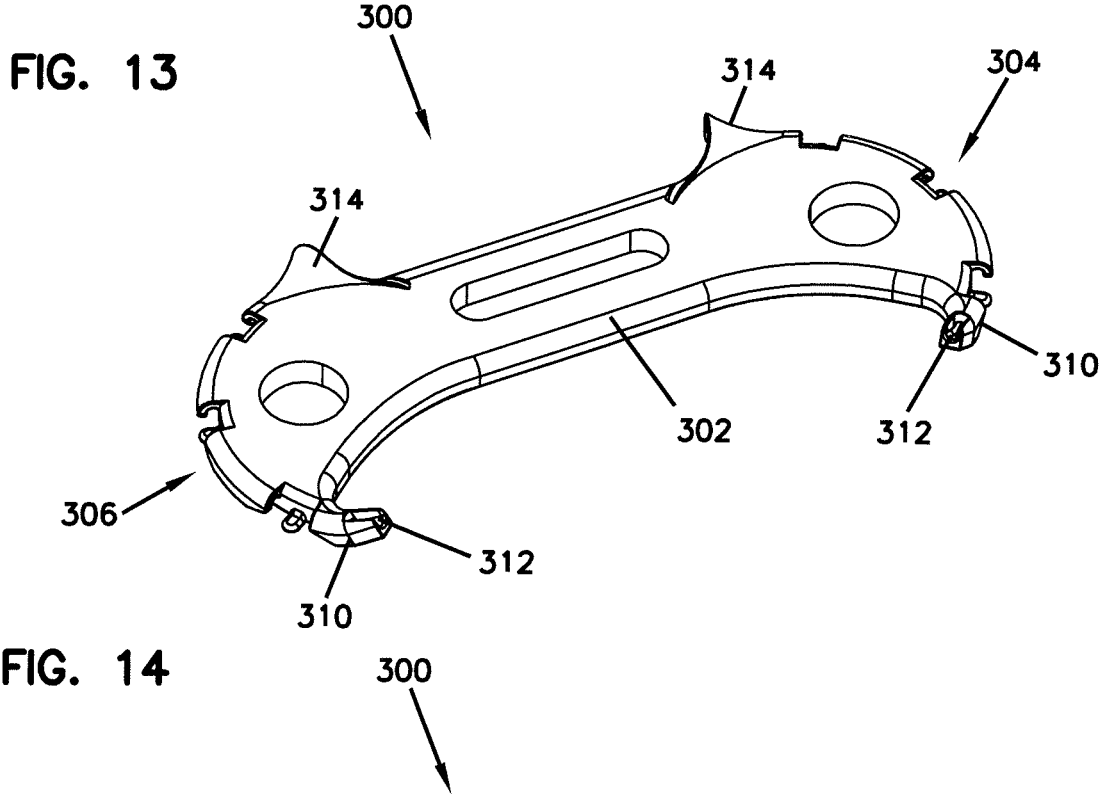
FIG. 13 is a bottom perspective view of the fiber threading tool of FIG. 12.
Figure 14:
FIG. 14 is a side view of the fiber threading tool of FIG. 12.

FIG. 11 is a perspective view of a portion of the fiber optic splice closure of FIG. 6, including the base 12 and the splice tray support rack 20, with the splice trays and cover removed. FIG. 12 is a top perspective view of an example fiber threading tool 300 that can be used with the closures and splice trays of the present disclosure. FIG. 13 is a bottom perspective view of the fiber threading tool 300 of FIG. 12. FIG. 14 is a side view of the fiber threading tool 300 of FIG. 12.

Referring to FIGS. 11-14, the splice tray support rack 20 has a series of horizontal rows of slots 25 extending between the first vertical channel 60 and the second vertical channel 62. Each slot is adapted to hingedly receive the hinged portion of a splice tray (e.g., the splice tray 200), and when multiple trays are coupled to the slots 25, the trays form a tray stack, as discussed above.

To ensure smooth routing of the optical fibers from the cables to the splice trays, optical fibers are fed from the cables entering the closure into and then up the channels 60 or 62 to the slot 25 corresponding to the splice tray intended to receive those fibers. The channels 60 and 62 are partially covered by staggered fingers 67 and also include indentations 69 to help guide the fibers into the channel and prevent the fibers from coming out of the channel once inserted.

Large enough splice trays installed on the support rack 20 can inhibit or prevent finger access to the channels 60, 62 needed to insert the fibers into the channels. Under such circumstances, the threading tool 300 can be used to facilitate inserting of the fibers into the channel 60, 62 and guiding them up the channel to the appropriate slot 25.

The example tool 300 includes a handle 302. Extending from the handle 302 are right and left oriented fiber routing portions 304 and 306. The right routing portion 304 is adapted for feeding fibers through the right channel 60, and the left routing portion 306 is adapted for feeding fibers through the left channel 62.

Optionally, each of the routing portions 304 and 306 includes a curved fiber receiving groove 308 having a radius of curvature that is greater than or equal to the minimum bend radius of the fibers it receives.

Each groove 308 terminates in a tip 310 having a threading eye 312. The tip 310 is curved downward relative to the upper planar surface 303 of the handle 302. The curved nature of the tip is adapted to bend the fibers such that they are biased into the fiber routing channels 60, 62 of the support rack 20 as the tool 300 works its way up the channel with fibers threaded through the tip 310. Optionally, an entryway into each groove 308 includes a flared portion 314 to facilitate feeding of the fibers into the groove 308.

Optionally the tool 300 can be used without guiding the fibers through the groove 308 and instead simply threading them through the eye 312 of the tip 310. However, utilization of the groove 308 can facilitate control of the rate at which fiber is dispensed as the fibers are guided up the channel 60, 62.

Each of the routing portions 304 and 306 can be designed with a small profile to enable its access to a channel 60, 62 through a relatively tight space between the channel and the splice trays.

Figure 15:
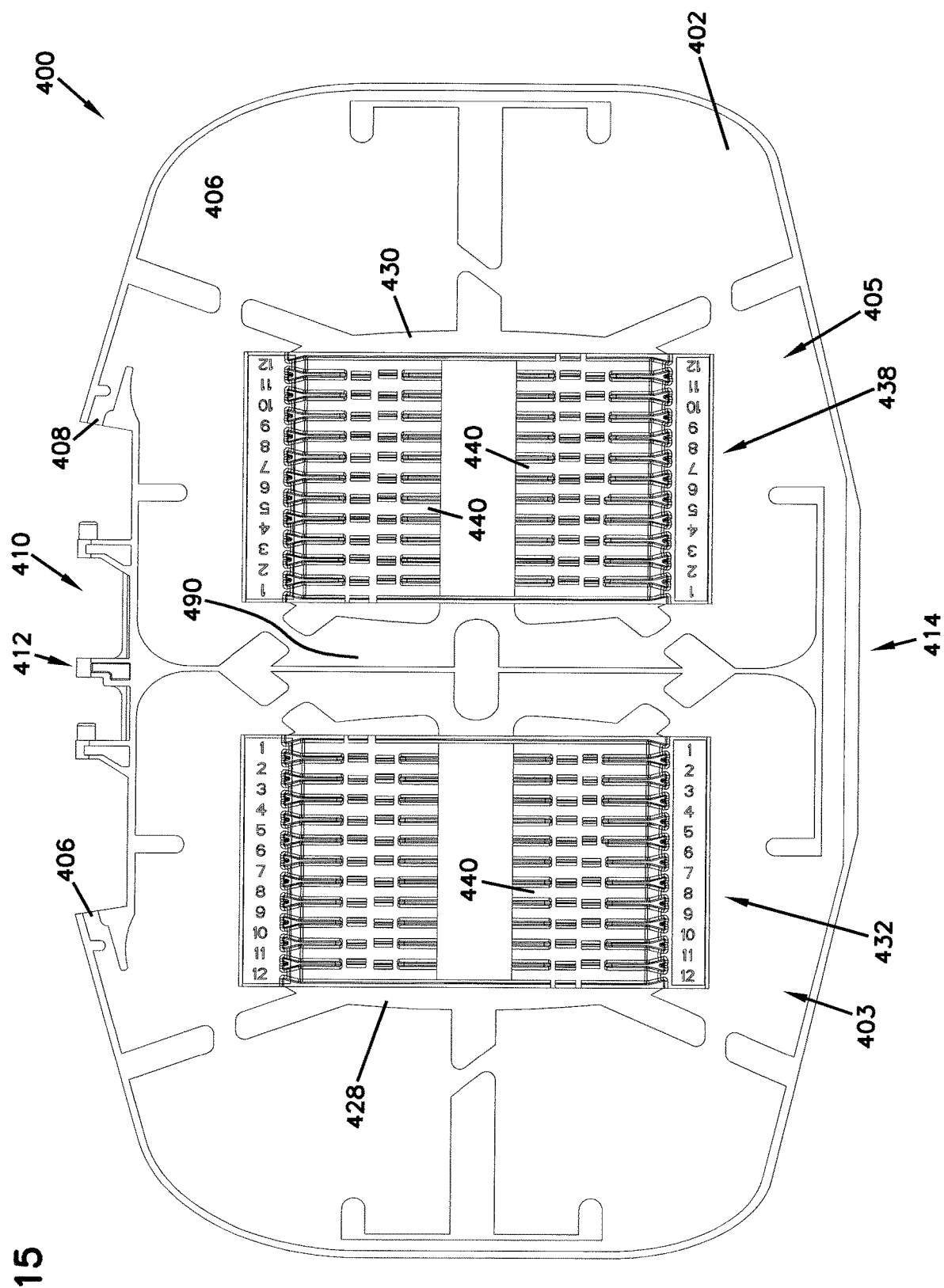
FIG. 15 is a top view of a further embodiment of a splice tray in accordance with the present disclosure.

FIG. 15 is a top view of a further embodiment of a splice tray 400 in accordance with the present disclosure. The splice tray 400 and/or a stack of splice trays 400 are configured to be mounted onto the support rack 20 within the closure 10 as described above.

Referring to FIG. 15, the splice tray 400 includes a major surface 402 on the upper side of the tray.

Fibers are routed from a channel 60 or 62 onto the splice tray 400 through one of the entryways 406, 408 on either side of the hinged portion 410 at the rear 412 of the splice tray 400. The front 414 is opposite the rear 412. Fibers fed through the right channel 60 can be routed to the left entryway 406 and fibers fed through the left channel 62 can be routed through the right entryway 408 so as to prevent over bending of the fibers.

The tray 400 includes two splice circuits 403 and 405. The first circuit 403 is disposed towards the left of the tray 400 and the second circuit 405 is disposed towards the right of the tray 400. Relative to the front 414 and the back 412, the two circuits 403 and 405 are similarly or equivalently positioned.

Each circuit 403, 405 includes a spooling structure 428, 430 protruding upwards from the major surface 402, with a first circuit splice holder area 432 disposed on top of the spooling structure 428, and a second circuit splice holder area 438 disposed on top of the spooling structure 430.

Each spooling structure wall defines a closed and substantially oblong shape defined by major and minor axes. The major axis is greater than or equal to the twice the minimum bend radius of the fibers destined to be looped around the spooling structure. The wall of each spooling structure includes an outer surface facing substantially away from the center of the oblong shape defined by the wall, and optical fibers are looped around the outer surfaces of the walls for purposes of organization.

Each splice holder area 432, 438 includes a plurality of splice holders 440. In the example shown, each area includes 12 splice holders 440 adapted to hold splices connecting fibers.

To make efficient use of space on the tray 400, the spooling structures 428 and 430 are sufficiently close to each other relative to the major surface 402 such that in an intermediate region 490 between the circuits 403 and 405, portions of loops of fibers from the first circuit can overlap portions of loops of fibers from the second circuit.

Figure 18:
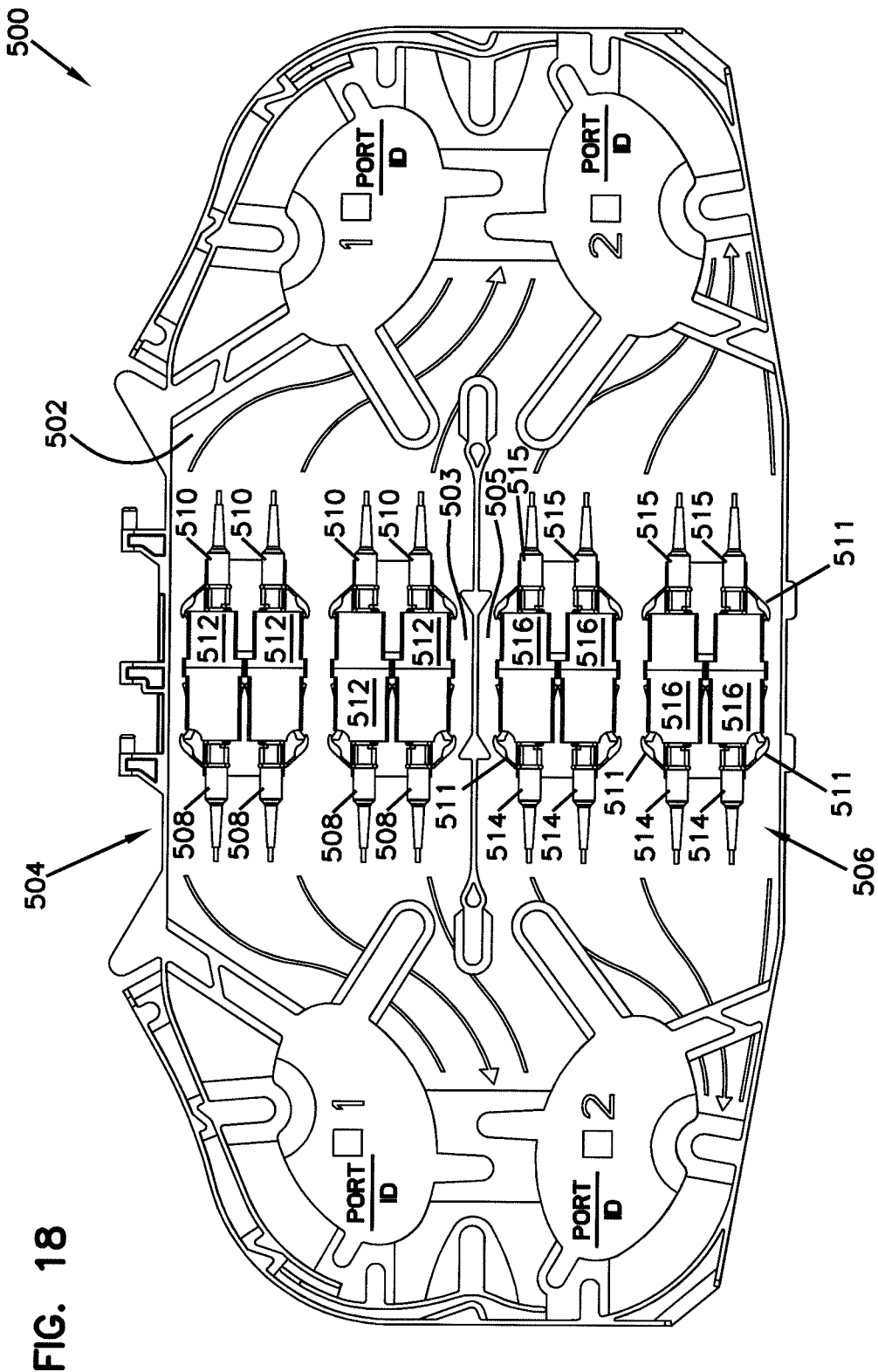
FIG. 18 is a top view of a further embodiment of a fiber optic tray in accordance with the present disclosure.

FIG. 18 is a top view of a further embodiment of a fiber optic tray 500 in accordance with the present disclosure. The tray 500 and/or a stack of trays 500 and/or a stack of trays 500 and one or more of the other trays described herein, are configured to be mounted onto the support rack 20 within the closure 10 as described above.

Referring to FIG. 18, the tray 500 includes a major surface 502 on the upper side of the tray.

The tray 500 is identical to the splice tray 200, except that the tray 500 does not include splice holders or splice holder areas. Instead, the tray 500 includes a first connector area 504 and a second connector area 506 separated from each other on the major surface 502 by cross-tray channels 503 and 505.

The first connector area 504 is associated with the first circuit of the tray 500 and provides for the connectorization of a first set of input fibers to a first set of output fibers on the tray 500. More specifically, a first set of input fibers are terminated in connectors 508. A first set of output fibers are terminated in connectors 510. The connectors 508 and 510 are optically connected to each other, e.g., at ferrule interfaces, via the adapters 512, the major surface 502 supporting the adapters 512 in the first connector area 504.

The second connector area 506 is associated with the second circuit of the tray 500 and provides for the connectorization of a second set of input fibers to a second set of output fibers on the tray 500. More specifically, a second set of input fibers are terminated in connectors 514. A second set of output fibers are terminated in connectors 515. The connectors 514 and 515 are optically connected to each other, e.g., at ferrule interfaces, via the adapters 516, the major surface 502 supporting the adapters 516 in the second connector area 506.

The input and output fibers can be organized in the fiber organizing areas of the tray 500 in the manner described above with respect to the splice tray 200.

It should be appreciated that the type of connectors and adapters that can be used in accordance with the principles of the tray 500 need not be the connectors and adapters shown. Different connector and adapter forms, such as LC, SC, MPO, and so forth, can also be used. In addition, the orientation of the adapters shown in FIG. 18 relative to the major surface 502 is just one orientation example that can help maximize the space available to access the latches 511 of the LC connectors 508, 510, 514, 515 in order to release them from their respective adapters while also minimizing the height of the tray needed to accommodate the adapters. Thus, in the example shown, pairs of connectors face away from each other with their latches 511 extending from the connector bodies substantially parallel to the major surface 502. However, alternative orientations of the adapters and connectors may be provided.

Example Embodiments

According to a first example embodiment of the present disclosure is provided an optical fiber splice kit comprising: one or more of the splice trays of the present disclosure; and a fiber routing tool, the fiber routing tool comprising: a handle; and at least one routing portion extending from the handle, the at least one routing portion including a tip defining a threading eye, the tip being curved away from a planar surface of the handle.

According to a second example embodiment is provided the first example embodiment, wherein the tool further comprises a curved fiber receiving groove having a radius of curvature that is greater than or equal to one half the width of at least one of the spooling structures along its major axis.

According to a third example embodiment is provided the first or the second embodiment, wherein the at least one routing portion includes first and second routing portions that are mirror images of each other.

According to a fourth example embodiment is provided a fiber optic tray comprising: a substantially oblong major surface defined by major and minor axes; first and second splice holder or connector holder areas supported on the major surface and separated from each other, each of the first and second splice holder or connector holder areas including a plurality of splice holders or connector holders; a first spooling structure including a wall protruding from the major surface, the wall enclosing a substantially oblong shape defined by major and minor axes, the first spooling structure being associated with the first splice holder area; and a second spooling structure including a wall protruding from the major surface, the wall enclosing a substantially oblong shape defined by major and minor axes, the second spooling structure being associated with the second splice holder area; wherein a width of each of the spooling structures along the major axis of the spooling structure is greater than or equal to twice a minimum bend radius of optical fibers; and wherein the first and second spooling structures are sufficiently close together on the major surface such that loops of a first set of the optical fibers spooled around the first spooling structure and having a radius of curvature equal to one half the width of the first spooling structure partially overlap loops of a second set of the optical fibers spooled around the second spooling structure and having a radius of curvature equal to one half the width of the second spooling structure.

According to a fifth example embodiment is provided the fourth example embodiment, comprising first and second connector holder areas each including a plurality of fiber optic adapters supported on the major surface.

According to a sixth example embodiment is provided a method of organizing optical fibers on a tray comprising: feeding a first set of input fibers of the optical fibers from an input cable mounted to a fiber optic closure through a first circuit input fiber pathway of the tray, the tray being mounted to a support rack of the closure; organizing the first set of input fibers in one or more loops around an input spool structure of the first circuit; feeding a first set of output fibers of the optical fibers from an output cable mounted to the fiber optic splice closure through a first circuit output fiber pathway of the tray; organizing the first set of output fibers in one or more loops around an output spool structure of the first circuit; feeding a second set of input fibers of the optical fibers from the input cable through a second circuit input fiber pathway of the tray; organizing the second set of input fibers in one or more loops around an input spool structure of the second circuit such that one or more loops of the second set of input fibers at least partially overlap one or more loops of the first set of input fibers; feeding a second set of output fibers of the optical fibers from the output cable through a second circuit output fiber pathway of the tray; and organizing the second set of output fibers in one or more loops around a second spool structure of the second circuit such that the loops of the second set of output fibers at least partially overlap the loops of the first set of output fibers.

According to a seventh example embodiment is provided the sixth example embodiment, further comprising: splicing one or more of the first set of input fibers to one or more of the first set of output fibers and positioning splices of the spliced first circuit fibers in splice holders of a first circuit splice holder area on the tray disposed between the input spool structure of the first circuit and the output spool structure of the first circuit; and/or splicing one or more of the second set of input fibers to one or more of the second set of output fibers and positioning splices of the spliced second circuit fibers in splice holders of a second circuit splice holder area on the tray disposed between the input spool structure of the second circuit and the output spool structure of the second circuit.

According to an eighth example embodiment is provided the sixth example embodiment, further comprising: connecting, via fiber optic connecters and adapters supported on the major surface of the tray, one or more of the first set of input fibers to one or more of the first set of output fibers and positioning connectors of the first circuit fibers in adapters of a first circuit connector area disposed on the tray between the input spool structure of the first circuit and the output spool structure of the first circuit; and/or connecting, via fiber optic connectors and adapters supported on the major surface of the tray, one or more of the second set of input fibers to one or more of the second set of output fibers and positioning connectors of the second circuit fibers in adapters of a second circuit connector area disposed on the tray between the input spool structure of the second circuit and the output spool structure of the second circuit.

Although in the foregoing description, terms such as "top," "bottom," "front," "back"/"rear," "horizontal," "vertical" may have been used for ease of description and illustration in relating features to one another, no restriction on the use of the components and assemblies of this disclosure is intended by such use of the terms.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:

1. A tray for optical fibers, comprising:
a major surface defining a major axis that is parallel to an elongate dimension of the major surface and a minor axis that is perpendicular to the major axis, the minor axis extending through a hinge portion of the tray, the hinge portion of the tray being configured to pivotally mount the tray to a support structure of telecommunications equipment; and
spooling structures, each spooling structure including a wall protruding from the major surface, the wall enclosing a shape, the shape having a longest dimension extending along a surface of the shape, the surface of the shape being parallel to the major surface, the longest dimension being oblique to both the major axis and the minor axis defined by the major surface, and wherein the wall extends to the major surface from opposite ends of the longest dimension.

2. The tray of claim 1, wherein the longest dimension of the shape of one of the spooling structures is not parallel to the longest dimension of the shape of another of the spooling structures.

3. The tray of claim 1, further comprising splice holders supported on the major surface.

4. The tray of claim 1, further comprising adapters configured to receive fiber optic connectors, the adapters being supported on the major surface.

5. The tray of claim 1, including four of the spooling structures, a first set of splice holders and a second set of splice holders, two of the spooling structures and the first set of splice holders being aligned with one another along a reference line parallel to the major axis with the first set of splice holders positioned between the two of the spooling structures and the other two of the spooling structures and the second set of splice holders being aligned with one another along another reference line parallel to major axis with the second set of splice holders positioned between the other two of the spooling structures.

6. The tray of claim 5, including a separation structure projecting from the major surface between the first set of splice holders and the second set of splice holders, the first set of splice holders, the second set of splice holders and the separation structure being aligned with the minor axis.

7. The tray of claim 1, including four of the spooling structures, a first set of adapters configured to receive fiber optic connectors and a second set of adapters configured to receive fiber optic connectors, the first set of adapters and the second set of adapters being supported on the major surface, two of the spooling structures and the first set of adapters being aligned with one another along a reference line parallel to the major axis with the first set of adapters positioned between the two of the spooling structures, and the other two of the spooling structures and the second set of adapters being aligned with one another along another reference line parallel to the major axis with the second set of adapters positioned between the other two of the spooling structures.

8. The tray of claim 7, including a separation structure projecting from the major surface between the first set of adapters and the second set of adapters, the first set of adapters, the second set of adapters and the separation structure being aligned with the minor axis.

9. The tray of claim 1, further comprising a finger extending from each spooling structure.

10. The tray of claim 1, wherein the minor axis bisects the major surface.

11. The tray of claim 1, wherein each of the spooling structures defines an indentation and a recess at different locations on the spooling structure.

12. The tray of claim 3, wherein the major surface includes indicia indicating a fiber routing path from one of the splice holders around one of the spooling structures.

13. The tray of claim 4, wherein the major surface includes indicia indicating a fiber routing path from one of the adapters around one of the spooling structures.

14. The tray of claim 1, wherein the telecommunications equipment includes a closure.

15. A tray for optical fibers, comprising:
a major surface defining a major axis that is parallel to an elongate dimension of the major surface and a minor axis that is perpendicular to the major axis and extends along a dimension of the major surface that is shorter than the elongate dimension, the minor axis extending through a hinge portion of the tray, the hinge portion of the tray being configured to pivotally mount the tray to a support structure of telecommunications equipment;
a first set of splice holders supported by the major surface and positioned entirely on one side of the minor axis;
a second set of splice holders supported by the major surface and positioned entirely on the other side of the minor axis;
first spooling structure portions protruding from the major surface and abutting the first set of splice holders on opposite sides of the first set of splice holders; and
second spooling structure portions protruding from the major surface abutting the second set of splice holders on opposite sides of the second set of splice holders,
wherein the first spooling structure portions are configured to guide fiber loops around the first set of splice holders in first loops that are entirely on the one side of the minor axis; and
wherein the second spooling structure portions are configured to guide fiber loops around the second set of splice holders in second loops that are entirely on the other side of the minor axis.

16. The tray of claim 15, wherein the telecommunications equipment includes a closure.

17. The tray of claim 15, further comprising a finger extending from each spooling structure portion.

* * * * *